United States Patent
Zhukov et al.

(10) Patent No.: US 11,776,034 B2
(45) Date of Patent: *Oct. 3, 2023

(54) SYSTEM AND METHOD OF MATCHING REVERSE AUCTION BUYER BIDS TO SELLER OFFERS

(71) Applicant: LetYouKnow, Inc., Seattle, WA (US)

(72) Inventors: Boris Aleksandrovich Zhukov, Raleigh, NC (US); Gang Shao, San Diego, CA (US)

(73) Assignee: LetYouKnow, Inc., Seattle, WA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/409,044

(22) Filed: Aug. 23, 2021

(65) Prior Publication Data
US 2021/0383448 A1 Dec. 9, 2021

Related U.S. Application Data

(63) Continuation of application No. 16/600,239, filed on Oct. 11, 2019, now Pat. No. 11,127,059.

(51) Int. Cl.
*G06Q 30/06* (2023.01)
*G06Q 30/0601* (2023.01)
(Continued)

(52) U.S. Cl.
CPC ......... *G06Q 30/0619* (2013.01); *G06Q 20/02* (2013.01); *G06Q 20/0855* (2013.01);
(Continued)

(58) Field of Classification Search
CPC ........... G06Q 30/0611; G06Q 30/0619; G06Q 30/0639; G06Q 30/08; G06Q 30/0601; G06Q 20/02; G06Q 20/0855
(Continued)

(56) References Cited

U.S. PATENT DOCUMENTS

| 6,691,094 B1 | 2/2004 | Herschkorn |
| 7,536,318 B1 | 5/2009 | Wolfe et al. |

(Continued)

FOREIGN PATENT DOCUMENTS

| CN | 101589385 A | 11/2009 |
| CN | 106537441 A | 3/2017 |

(Continued)

OTHER PUBLICATIONS

Boutin, Paul; "A Universe of Gadget Advice", New York Times, Late Edition (East Coast) [New York, N.Y.] Dec. 13, 2007: C.10; retrieved from Dialog database online on Jan. 3, 2022 (Year: 2007).*

(Continued)

*Primary Examiner* — Yogesh C Garg
(74) *Attorney, Agent, or Firm* — BakerHostetler

(57) ABSTRACT

The present invention is directed towards systems and methods for matching buyers to dealers of the same type of vehicle. Buyer bids are ranked based on receipt time. Buyers specify a search radius corresponding to dealers. Dealer offers correspond to an acceptable amount for the vehicle. A high price is computed for each vehicle from dealers relative to buyers based on dealer offers and MSRP. A final price is computed for each vehicle based on dealer offers, the search radius, and the high price. Final prices are ranked based on the distance from buyer to dealer and the buyer bid dealer offer difference. The match is based on the highest rank final price for the corresponding dealer to an earliest received buyer bid that has not been matched if the vehicle offered by the corresponding dealer is available.

19 Claims, 37 Drawing Sheets

(51) Int. Cl.
  *G06Q 30/08* (2012.01)
  *G06Q 20/02* (2012.01)
  *G06Q 20/08* (2012.01)
(52) U.S. Cl.
  CPC ..... *G06Q 30/0611* (2013.01); *G06Q 30/0639* (2013.01); *G06Q 30/08* (2013.01)
(58) Field of Classification Search
  USPC .......................... 705/26.3, 26.42, 26.9, 26.1
  See application file for complete search history.

(56) References Cited

U.S. PATENT DOCUMENTS

| | | | |
|---|---|---|---|
| 8,521,615 | B2 | 8/2013 | Inghelbrect et al. |
| 2001/0032165 | A1* | 10/2001 | Friend .................... G06Q 30/06 705/26.1 |
| 2003/0061060 | A1* | 3/2003 | Tenorio ................. G06Q 30/06 705/26.62 |
| 2004/0181457 | A1* | 9/2004 | Biebesheimer .... G06Q 30/0251 705/27.1 |
| 2005/0065853 | A1 | 3/2005 | Ferreira |
| 2007/0124216 | A1* | 5/2007 | Lucas .................... G06Q 30/02 705/26.1 |
| 2008/0177653 | A1 | 7/2008 | Famolari et al. |
| 2008/0201202 | A1 | 8/2008 | Rose et al. |
| 2008/0235043 | A1 | 9/2008 | Goulandris et al. |
| 2009/0138374 | A1 | 5/2009 | Cohen |
| 2010/0250444 | A1 | 9/2010 | Haun |
| 2010/0332345 | A1 | 12/2010 | Mohr et al. |
| 2012/0036033 | A1 | 2/2012 | Seergy et al. |
| 2012/0259728 | A1 | 10/2012 | Inghelbrecht et al. |
| 2013/0132431 | A1* | 5/2013 | Platt ........................ G06F 16/29 707/E17.044 |
| 2015/0073942 | A1* | 3/2015 | Narasimhan ........ G06F 16/2452 705/26.62 |
| 2015/0081467 | A1 | 3/2015 | Grigg et al. |
| 2019/0139113 | A1 | 5/2019 | Andropov et al. |
| 2019/0172128 | A1 | 6/2019 | Fisher |
| 2021/0241397 | A1* | 8/2021 | Norelius .............. G06Q 20/401 |

FOREIGN PATENT DOCUMENTS

| | | | | |
|---|---|---|---|---|
| EP | 2615575 A1 | | 7/2013 | |
| JP | 2003-173404 A | | 6/2003 | |
| JP | 2003-611450 A | | 6/2003 | |
| KR | 20150094959 A | * | 8/2015 | ............ G06Q 30/08 |
| TW | 200941371 A | | 10/2009 | |
| WO | WO-0043933 A1 | * | 7/2000 | ............ G06Q 30/06 |
| WO | WO-0060491 A2 | * | 10/2000 | ............ G06Q 10/02 |
| WO | WO-0235427 A1 | * | 5/2002 | ............ G06Q 10/087 |

OTHER PUBLICATIONS

Ykhlef, Mourad; Alqifari, Reem, "A New Hybrid Algorithm to Solve Winner Determination Problem in Multiunit Double Internet Auction", Published in Mathematical Problems in Engineering 2015 Hindawi Limited. (2015), retrieved from Dialog on Apr. 18, 2023 (Year: 2015).*

"Speedware: International commerce has come a long way since John Cabot's time"; M2 Presswire May 1, 1997; retrieved from Dialog on Aug. 2, 2023; (Year: 1997).*

International Patent Application No. PCT/US2020/054769; Int'l Search Report and the Written Opinion; dated Jan. 22, 2021; 7 pages.

Glover et al.; "Wheels and the Web: You get a lot of mileage out of CarsDirect.com"; May 24, 2006; Tribune Business News (Washington); extracted from dialog on Mar. 2, 2021.

* cited by examiner

BUYER BID TIME STAMP AND SEARCH RADIUS

| Buyer Name - 2020 XYZ, Model X, Trim Sport, Hybrid, Any Exterior Color, Any Interior Color, Optional Packages: None, Dealer-Installed Accessories: ANY | Time | Microseconds format | Buyer Rank | Buyer Zip Code | Buyer Search Radius | Distance to Dealer A | Distance to Dealer B | Distance to Dealer C | Distance to Dealer D | Distance to Dealer E | Distance to Dealer F | Distance to Dealer G |
|---|---|---|---|---|---|---|---|---|---|---|---|---|
| AA | 16:45:23 | 23.791239 | 14 | 22030 | 75 | 22 | 245 | 465 | 619 | 458 | 173 | 60 |
| ZA | 16:45:23 | 23.011502 | 1 | 30804 | 1000 | 635 | 400 | 160 | 12 | 183 | 403 | 543 |
| KH | 16:45:23 | 23.922086 | 20 | 30026 | 250 | 624 | 389 | 149 | 15 | 180 | 452 | 532 |
| CJ | 16:45:23 | 23.470800 | 9 | 28134 | 500 | 421 | 183 | 84 | 228 | 123 | 249 | 327 |
| LM | 16:45:23 | 23.641701 | 13 | 28031 | 200 | 392 | 174 | 92 | 246 | 132 | 220 | 331 |
| JL | 16:45:23 | 23.494753 | 10 | 27519 | 100 | 268 | 26 | 227 | 381 | 239 | 185 | 257 |
| VZ | 16:45:23 | 23.285172 | 6 | 27617 | 25 | 260 | 15 | 222 | 385 | 243 | 189 | 250 |
| TH | 16:45:23 | 23.541124 | 12 | 20170 | 50 | 15 | 264 | 484 | 653 | 464 | 179 | 32 |
| NO | 16:45:23 | 23.064909 | 3 | 29401 | 250 | 526 | 288 | 201 | 327 | 485 | 445 | 551 |
| TV | 16:45:23 | 23.189040 | 4 | 25301 | 320 | 353 | 322 | 326 | 523 | 292 | 174 | 356 |
| NR | 16:45:23 | 23.387240 | 8 | 24450 | 200 | 182 | 208 | 316 | 470 | 295 | 72 | 208 |
| MG | 16:45:23 | 23.193085 | 5 | 37901 | 150 | 471 | 364 | 173 | 304 | 112 | 299 | 497 |
| SB | 16:45:23 | 23.498798 | 11 | 28715 | 75 | 408 | 263 | 72 | 180 | 10 | 296 | 494 |
| GW | 16:45:23 | 23.050182 | 2 | 29601 | 250 | 502 | 267 | 77 | 134 | 58 | 330 | 514 |
| DM | 16:45:23 | 23.833965 | 16 | 31302 | 300 | 570 | 332 | 240 | 266 | 306 | 490 | 595 |
| JP | 16:45:23 | 23.889962 | 19 | 30625 | 100 | 622 | 384 | 160 | 90 | 192 | 479 | 647 |
| LS | 16:45:23 | 23.868800 | 18 | 22206 | 50 | 17 | 246 | 467 | 620 | 478 | 192 | 29 |
| MA | 16:45:23 | 23.844646 | 17 | 20847 | 25 | 22 | 264 | 484 | 638 | 479 | 194 | 16 |
| AS | 16:45:23 | 23.349260 | 7 | 23173 | 250 | 103 | 152 | 373 | 526 | 384 | 153 | 128 |
| BZ | 16:45:23 | 23.804512 | 15 | 47374 | 500 | 510 | 506 | 487 | 517 | 426 | 417 | 502 |

FIG. 1

DEALERSHIP PRICE OFFERS AND INITIAL COMPUTATIONS

| Dealer Name - 2020 XYZ, Model X, Trim Sport Hybrid, Any Exterior Color, Any Interior Color, Optional Packages: None, Dealer-Installed Accessories: ANY, MSRP: | Address; ZIP Code | Price | LPQ | PrelimHPQ | HPQ |
|---|---|---|---|---|---|
| | 20 | 22 | 24 | 26 | 28 |
| Dealer A | XXX, Fairfax, VA 22030 | 20,000.00 | 20,299.00 | 21,560.52 | 21,560.52 |
| Dealer A | XXX, Fairfax, VA 22030 | 19,500.00 | 19,799.00 | 20,747.66 | 20,747.66 |
| Dealer B | XXX, Raleigh, NC 27616 | 22,000.00 | 22,299.00 | 24,129.03 | 24,129.03 |
| Dealer B | XXX, Raleigh, NC 27616 | 18,900.00 | 19,199.00 | 19,682.07 | 19,682.07 |
| Dealer C | XXX, Spartanburg, SC 29301 | 23,000.00 | 23,299.00 | 25,003.50 | 25,003.50 |
| Dealer C | XXX, Spartanburg, SC 29301 | 20,800.00 | 21,099.00 | 22,719.05 | 22,719.05 |
| Dealer D | XXX, Roswell, GA 30076 | 22,500.00 | 22,799.00 | 24,600.41 | 24,600.41 |
| Dealer D | XXX, Roswell, GA 30076 | 21,750.00 | 22,049.00 | 23,867.72 | 23,867.72 |
| Dealer E | XXX, Asheville, NC 28806 | 20,850.00 | 21,149.00 | 22,783.66 | 22,783.66 |
| Dealer E | XXX, Asheville, NC 28806 | 21,275.00 | 21,574.00 | 23,324.21 | 23,324.21 |
| Dealer F | XXX, Lexington, VA 24450 | 25,000.00 | 25,299.00 | 25,932.88 | 25,932.88 |
| Dealer F | XXX, Lexington, VA 24450 | 23,600.00 | 23,899.00 | 25,397.05 | 25,397.05 |
| Dealer G | XXX, Silver Spring, MD 20904 | 19,850.00 | 20,149.00 | 21,323.84 | 21,323.84 |
| Dealer G | XXX, Silver Spring, MD 20904 | 20,150.00 | 20,449.00 | 21,791.07 | 21,791.07 |

FIG. 2

DEALERSHIP FINAL PRICE COMPUTATION

| Buyer Name – 2020 XYZ Model X, Trim Sport Hybrid, Any Exterior Color, Any Interior Color, Optional Packages None, Dealer-Installed Accessories: | Buyer Bid | Dealer A, Vehicle 1, Price As Compared to Buyer XX | Dealer A, Vehicle 2, Price As Compared to Buyer XX | Dealer B, Vehicle 1, Price As Compared to Buyer XX | Dealer B, Vehicle 2, Price As Compared to Buyer XX | Dealer C, Vehicle 1, Price As Compared to Buyer XX | Dealer C, Vehicle 2, Price As Compared to Buyer XX |
|---|---|---|---|---|---|---|---|
| ANY | | | | | | | |
| AA | 22,850.00 | 20,684.10 | 20,088.59 | 22,887.65 | 19,346.46 | 23,819.33 | 21,593.55 |
| ZA | 20,700.00 | 20,299.00 | 19,799.00 | 22,299.00 | 19,199.00 | 23,299.00 | 21,099.00 |
| KH | 11,200.00 | 20,439.70 | 19,904.81 | 22,503.11 | 19,252.88 | 23,489.11 | 21,279.69 |
| CJ | 19,000.00 | 20,299.00 | 19,799.00 | 22,299.00 | 19,199.00 | 23,299.00 | 21,099.00 |
| LM | 23,000.00 | 20,485.00 | 19,938.87 | 22,568.82 | 19,270.22 | 23,550.31 | 21,337.86 |
| HL | 24,000.00 | 20,625.71 | 20,044.68 | 22,772.93 | 19,324.10 | 23,740.42 | 21,518.56 |
| VZ | 23,788.00 | 21,560.52 | 20,747.66 | 24,129.03 | 19,682.07 | 25,003.50 | 22,719.05 |
| TH | 24,200.00 | 20,766.41 | 20,150.49 | 22,977.03 | 19,377.98 | 23,930.54 | 21,699.23 |
| NO | 20,980.00 | 20,439.70 | 19,904.81 | 22,503.11 | 19,252.88 | 23,489.11 | 21,279.69 |
| TV | 23,200.00 | 20,371.40 | 19,853.45 | 22,404.03 | 19,226.72 | 23,386.83 | 21,191.98 |
| NR | 23,750.00 | 20,485.00 | 19,938.87 | 22,568.82 | 19,270.22 | 23,550.31 | 21,337.86 |
| MG | 21,222.00 | 20,541.40 | 19,982.79 | 22,653.54 | 19,292.59 | 23,629.22 | 21,412.86 |
| SB | 20,965.00 | 20,684.10 | 20,088.59 | 22,887.65 | 19,346.46 | 23,819.33 | 21,593.55 |
| GW | 24,111.00 | 20,439.70 | 19,904.81 | 22,503.11 | 19,252.88 | 23,489.11 | 21,279.69 |
| DM | 19,999.00 | 20,402.69 | 19,876.98 | 22,449.42 | 19,238.71 | 23,439.11 | 21,222.10 |
| JP | 20,664.00 | 20,625.71 | 20,044.68 | 22,772.93 | 19,324.10 | 23,740.42 | 21,518.56 |
| LS | 12,000.00 | 20,766.41 | 20,150.49 | 22,977.03 | 19,577.98 | 23,930.54 | 21,699.25 |
| MA | 23,542.00 | 21,560.52 | 20,747.66 | 24,129.03 | 19,682.07 | 25,003.50 | 22,719.05 |
| AS | 22,101.00 | 20,439.70 | 19,904.81 | 22,503.11 | 19,252.88 | 23,489.11 | 21,279.69 |
| BZ | 20,145.00 | 20,299.00 | 19,799.00 | 22,299.00 | 19,199.00 | 23,299.00 | 21,099.00 |

FIG. 3A

DEALERSHIP FINAL PRICE COMPUTATION

| Dealer D, Vehicle 1, Price As Compared to Buyer XX | Dealer D, Vehicle 2, Price As Compared to Buyer XX | Dealer E, Vehicle 1, Price As Compared to Buyer XX | Dealer E, Vehicle 2, Price As Compared to Buyer XX | Dealer F, Vehicle 1, Price As Compared to Buyer XX | Dealer F, Vehicle 2, Price As Compared to Buyer XX | Dealer G, Vehicle 1, Price As Compared to Buyer XX | Dealer G, Vehicle 2, Price As Compared to Buyer XX |
|---|---|---|---|---|---|---|---|
| 23,348.91 | 22,604.20 | 21,648.62 | 22,108.28 | 25,492.50 | 24,356.31 | 20,507.64 | 20,858.69 |
| 22,799.00 | 22,049.00 | 21,149.00 | 21,574.00 | 25,299.00 | 23,899.00 | 20,149.00 | 20,449.00 |
| 22,999.92 | 22,251.85 | 21,331.54 | 21,769.21 | 25,369.70 | 24,066.09 | 20,280.04 | 20,598.69 |
| 22,799.80 | 22,049.00 | 21,149.00 | 21,574.00 | 25,299.00 | 23,899.00 | 20,149.00 | 20,449.00 |
| 23,064.60 | 22,317.16 | 21,390.31 | 21,832.05 | 25,392.46 | 24,119.87 | 20,322.22 | 20,646.88 |
| 23,265.52 | 22,520.01 | 21,572.86 | 22,027.26 | 25,463.16 | 24,286.96 | 20,453.25 | 20,796.56 |
| 24,600.41 | 23,867.72 | 22,785.66 | 23,324.21 | 25,932.88 | 25,397.05 | 21,323.84 | 21,791.07 |
| 23,466.44 | 22,722.86 | 21,755.40 | 22,222.47 | 25,533.86 | 24,454.04 | 20,584.29 | 20,946.25 |
| 22,999.92 | 22,251.85 | 21,331.54 | 21,769.21 | 25,369.70 | 24,066.09 | 20,280.04 | 20,598.69 |
| 22,902.39 | 22,153.38 | 21,242.93 | 21,674.45 | 25,335.38 | 23,984.98 | 20,216.43 | 20,526.03 |
| 23,064.60 | 22,317.16 | 21,390.31 | 21,832.05 | 25,392.46 | 24,119.87 | 20,322.22 | 20,646.88 |
| 23,147.99 | 22,401.35 | 21,466.07 | 21,913.07 | 25,421.80 | 24,189.22 | 20,376.60 | 20,709.00 |
| 23,348.91 | 22,604.20 | 21,648.62 | 22,108.28 | 25,492.50 | 24,356.31 | 20,507.64 | 20,858.69 |
| 22,999.92 | 22,251.85 | 21,331.54 | 21,769.21 | 25,369.70 | 24,066.09 | 20,280.04 | 20,598.69 |
| 22,947.07 | 22,198.49 | 21,283.53 | 21,717.86 | 25,351.10 | 24,022.14 | 20,245.57 | 20,559.31 |
| 23,265.52 | 22,520.01 | 21,572.86 | 22,027.26 | 25,463.16 | 24,286.96 | 20,453.25 | 20,796.56 |
| 23,466.44 | 22,722.86 | 21,755.40 | 22,222.47 | 25,533.86 | 24,454.04 | 20,584.29 | 20,946.25 |
| 24,600.41 | 23,867.72 | 22,785.66 | 23,324.21 | 25,932.88 | 25,397.05 | 21,323.84 | 21,791.07 |
| 22,999.92 | 22,251.85 | 21,331.54 | 21,769.21 | 25,369.70 | 24,066.09 | 20,280.04 | 20,598.69 |
| 22,799.00 | 22,049.00 | 21,149.00 | 21,574.00 | 25,299.00 | 23,899.00 | 20,149.00 | 20,449.00 |

FIG. 3B

SEARCH RADIUS CHECK

| Buyer Name | Dealer A Within Search Radius | Dealer B Within Search Radius | Dealer C Within Search Radius | Dealer D Within Search Radius | Dealer E Within Search Radius | Dealer F Within Search Radius | Dealer G Within Search Radius |
|---|---|---|---|---|---|---|---|
| AA | 1 | 0 | 0 | 0 | 0 | 0 | 1 |
| ZA | 1 | 1 | 1 | 1 | 1 | 1 | 1 |
| KH | 0 | 0 | 1 | 1 | 1 | 0 | 0 |
| CJ | 1 | 1 | 1 | 1 | 1 | 1 | 1 |
| LM | 0 | 1 | 1 | 1 | 1 | 0 | 0 |
| JL | 0 | 1 | 0 | 0 | 0 | 0 | 0 |
| VZ | 0 | 1 | 0 | 0 | 0 | 0 | 0 |
| TH | 1 | 0 | 0 | 0 | 0 | 0 | 1 |
| NO | 0 | 0 | 1 | 1 | 0 | 0 | 0 |
| TV | 1 | 1 | 1 | 1 | 1 | 1 | 0 |
| NR | 0 | 0 | 0 | 0 | 1 | 1 | 0 |
| MG | 0 | 0 | 1 | 1 | 1 | 1 | 0 |
| SB | 0 | 0 | 1 | 0 | 1 | 0 | 0 |
| GW | 0 | 0 | 1 | 1 | 1 | 0 | 0 |
| DM | 0 | 0 | 0 | 1 | 1 | 0 | 0 |
| JP | 1 | 0 | 0 | 0 | 0 | 0 | 1 |
| LS | 1 | 0 | 0 | 0 | 0 | 0 | 1 |
| MA | 1 | 1 | 0 | 0 | 0 | 0 | 1 |
| AS | 1 | 0 | 0 | 0 | 0 | 0 | 1 |
| BZ | 0 | 0 | 1 | 0 | 1 | 1 | 0 |

PRICE COMPUTATIONS WITH BUYER SEARCH RADIUS

| Buyer Name - 2020 XYZ, Model X, Trim Sport Hybrid, Any Exterior Color, Any Interior Color, Optional Packages: None, Dealer-Installed Accessories: ANY | Buyer Bid | Dealer A, Vehicle 1, Price As Compared to Buyer XX | Dealer A, Vehicle 2, Price As Compared to Buyer XX | Dealer B, Vehicle 1, Price As Compared to Buyer XX | Dealer B, Vehicle 2, Price As Compared to Buyer XX | Dealer C, Vehicle 1, Price As Compared to Buyer XX | Dealer C, Vehicle 2, Price As Compared to Buyer XX |
|---|---|---|---|---|---|---|---|
| AA | 22,850.00 | 20,684.10 | 20,088.59 | - | - | - | - |
| ZA | 20,700.00 | 20,299.00 | 19,799.00 | 22,299.00 | 19,199.00 | 23,299.00 | 21,099.00 |
| KH | 21,200.00 | - | - | - | - | 23,489.11 | 21,279.69 |
| CJ | 19,000.00 | 20,299.00 | 19,799.00 | 22,299.00 | 19,199.00 | 21,299.00 | 21,099.00 |
| LM | 23,000.00 | - | - | 22,568.82 | 19,270.22 | 23,550.31 | 21,337.86 |
| HL | 24,000.00 | - | - | 22,772.99 | 19,334.10 | - | - |
| VZ | 23,788.00 | - | - | 24,129.03 | 19,682.07 | - | - |
| TH | 24,200.00 | 20,766.41 | 20,150.49 | - | - | - | - |
| NO | 28,980.00 | - | - | - | - | 23,489.11 | 21,279.69 |
| TV | 23,200.00 | 20,485.00 | 19,928.87 | 22,404.03 | 19,226.72 | 23,396.83 | 21,191.98 |
| NR | 23,750.00 | - | - | - | - | - | - |
| MC | 21,222.00 | - | - | - | - | - | - |
| SB | 20,965.00 | - | - | - | - | 23,819.93 | 21,593.55 |
| GW | 24,111.00 | - | - | - | - | 23,489.11 | 21,279.69 |
| DM | 19,999.00 | - | - | - | - | 23,439.11 | 21,233.16 |
| JP | 20,664.00 | - | - | - | - | - | - |
| LS | 12,000.00 | 20,766.41 | 20,150.49 | - | - | - | - |
| MA | 23,542.00 | 21,560.52 | 20,747.66 | - | - | - | - |
| AS | 22,101.00 | 20,439.70 | 19,904.81 | 22,503.11 | 19,232.88 | - | - |
| BZ | 20,145.00 | - | - | - | - | 23,299.00 | 21,099.00 |

FIG. 5A

PRICE COMPUTATIONS WITH BUYER SEARCH RADIUS

| Dealer D, Vehicle 1, Price As Compared to Buyer XX | Dealer D, Vehicle 2, Price As Compared to Buyer XX | Dealer E, Vehicle 1, Price As Compared to Buyer XX | Dealer E, Vehicle 2, Price As Compared to Buyer XX | Dealer F, Vehicle 1, Price As Compared to Buyer XX | Dealer F, Vehicle 2, Price As Compared to Buyer XX | Dealer G, Vehicle 1, Price As Compared to Buyer XX | Dealer G, Vehicle 2, Price As Compared to Buyer XX |
|---|---|---|---|---|---|---|---|
| - | - | - | - | - | - | - | - |
| 22,799.00 | 22,049.00 | 21,149.00 | 21,574.00 | 25,299.00 | 23,899.00 | 20,507.64 | 20,858.69 |
| 22,999.92 | 22,251.85 | 21,331.54 | 21,769.21 | - | - | 20,149.00 | 20,449.00 |
| 22,799.00 | 22,049.00 | 21,149.00 | 21,574.00 | 25,299.00 | 23,899.00 | 20,149.00 | 20,449.00 |
| - | - | 21,390.31 | 21,832.05 | - | - | - | - |
| - | - | - | - | - | - | - | - |
| - | - | - | - | - | - | - | - |
| - | - | 21,242.93 | 21,674.45 | 25,335.38 | 23,984.98 | 20,584.29 | 20,946.25 |
| - | - | 21,466.07 | 21,913.07 | 25,392.46 | 24,119.87 | - | - |
| - | - | 21,648.62 | 22,108.28 | - | - | - | - |
| 22,999.92 | 22,251.85 | 21,331.54 | 21,769.21 | - | - | - | - |
| 22,947.07 | 22,198.49 | - | - | - | - | - | - |
| 23,265.52 | 22,520.01 | - | - | - | - | - | - |
| - | - | - | - | - | - | 20,584.29 | 20,946.25 |
| - | - | - | - | - | - | 21,323.84 | 21,791.07 |
| - | - | - | - | 25,369.70 | 24,066.09 | 20,280.04 | 20,598.69 |
| - | - | 21,149.00 | 21,574.00 | 25,299.00 | 23,899.00 | - | - |

FIG. 5B

PRICE COMPARISON

| Buyer Name - 2020 XYZ, Model X, Trim Sport Hybrid, Any Exterior Color, Any Interior Color, Optional Packages: None, Dealer-Installed Accessories: | Buyer Bid | Dealer A, Vehicle 1, Price As Compared to Buyer XX | Dealer A, Vehicle 2, Price As Compared to Buyer XX | Dealer B, Vehicle 1, Price As Compared to Buyer XX | Dealer B, Vehicle 2, Price As Compared to Buyer XX | Dealer C, Vehicle 1, Price As Compared to Buyer XX | Dealer C, Vehicle 2, Price As Compared to Buyer XX |
|---|---|---|---|---|---|---|---|
| ANY | | | | | | | |
| AA | 22,850.00 | 20,684.10 | 20,083.59 | | | | |
| ZA | 20,700.00 | 20,299.00 | 19,799.00 | | 19,199.00 | | |
| KH | 21,100.00 | | | | | | |
| CJ | 19,000.00 | | | | | | |
| LM | 22,000.00 | | | 22,568.82 | 19,270.22 | | 21,337.86 |
| JL | 24,000.00 | | | 22,772.93 | 19,324.10 | | |
| VZ | 23,788.00 | | | | 19,682.07 | | |
| TH | 24,200.00 | 20,766.41 | 20,150.49 | | | | |
| NO | 20,980.00 | | | | | | |
| TV | 23,200.00 | | | 22,404.03 | 19,226.72 | | 21,191.98 |
| NR | 23,750.00 | 20,483.00 | 19,938.87 | | | | |
| MG | 21,222.00 | | | | | | |
| SB | 20,965.00 | | | | | | |
| GW | 24,111.00 | | | | | 22,489.11 | 21,279.69 |
| DM | 19,999.00 | | | | | | |
| JP | 20,664.00 | | | | | | |
| LS | 12,000.00 | | | | | | |
| MA | 23,542.00 | 21,560.52 | 20,747.66 | | | | |
| AS | 22,101.00 | 20,439.70 | 19,904.81 | | 19,222.88 | | |
| BZ | 20,145.00 | | | | | | |

FIG. 6A

PRICE COMPARISON

| Dealer D, Vehicle 1, Price As Compared to Buyer XX | Dealer D, Vehicle 2, Price As Compared to Buyer XX | Dealer E, Vehicle 1, Price As Compared to Buyer XX | Dealer E, Vehicle 2, Price As Compared to Buyer XX | Dealer F, Vehicle 1, Price As Compared to Buyer XX | Dealer F, Vehicle 2, Price As Compared to Buyer XX | Dealer G, Vehicle 1, Price As Compared to Buyer XX | Dealer G, Vehicle 2, Price As Compared to Buyer XX |
|---|---|---|---|---|---|---|---|
| - | - | - | - | - | - | 20,507.64 | 20,858.69 |
| - | - | - | - | - | - | 20,149.00 | 20,449.00 |
| - | - | 21,390.31 | 21,832.05 | - | - | - | - |
| - | - | - | - | - | - | - | - |
| - | - | 21,242.93 | 21,674.45 | - | - | 20,584.29 | 20,946.25 |
| - | - | - | - | - | - | - | - |
| - | - | 21,331.54 | 21,769.21 | - | - | - | - |
| - | - | - | - | - | - | - | - |
| 22,999.92 | 22,251.85 | - | - | - | - | - | - |
| - | - | - | - | - | - | 21,323.84 | 21,791.07 |
| - | - | - | - | - | - | 20,280.04 | 20,598.69 |
| | | | | | | | |

FIG. 6B

RAW DEALERSHIP RANKING

| Buyer Name - 2020 XYZ, Model X, Trim Sport Hybrid, Any Exterior Color, Any Interior Color, Optional Packages: None, Dealer-Installed Accessories | Buyer Bid | Dealer A Rank Value, Vehicle 1. Price As Compared to Buyer XX | Dealer A Rank Value, Vehicle 2. Price As Compared to Buyer XX | Dealer B Rank Value, Vehicle 1. Price As Compared to Buyer XX | Dealer B Rank Value, Vehicle 2. Price As Compared to Buyer XX | Dealer C Rank Value, Vehicle 1. Price As Compared to Buyer XX | Dealer C Rank Value, Vehicle 2. Price As Compared to Buyer XX |
|---|---|---|---|---|---|---|---|
| ANY | | | | | | | |
| AA | 22,850.00 | 20,106.94 | 24,047.93 | | | | |
| ZA | 20,700.00 | 386.15 | 867.63 | | 1,556.90 | | |
| KH | 21,200.00 | | | | | | |
| CJ | 19,000.00 | | | | | | |
| LM | 23,000.00 | | | 844.43 | 4,578.69 | | 2,612.68 |
| IL | 24,000.00 | | | 3,244.55 | 9,157.60 | | |
| VZ | 23,788.00 | | | | 10,531.13 | | |
| TH | 24,200.00 | 8,952.27 | 10,099.70 | | | | |
| NO | 20,980.00 | | | | | | |
| TV | 23,200.00 | | | 969.66 | 4,305.90 | | 2,244.57 |
| NR | 23,750.00 | 4,121.17 | 4,718.27 | | | | |
| MG | 21,222.00 | | | | | | |
| SB | 20,965.00 | | | | | | |
| GW | 24,111.00 | | | | | 1,531.10 | 5,679.41 |
| DM | 19,999.00 | | | | | | |
| JP | 20,664.00 | | | | | | |
| LS | 12,000.00 | | | | | | |
| MA | 23,542.00 | 6,520.12 | 7,525.38 | | | | |
| AS | 22,101.00 | 2,416.26 | 3,086.70 | | 3,569.81 | | |
| BZ | 20,145.00 | | | | | | |

FIG. 7A

RAW DEALERSHIP RANKING

| Dealer D Rank Value, Vehicle 1, Price As Compared to Buyer XX | Dealer D Rank Value, Vehicle 2, Price As Compared to Buyer XX | Dealer E Rank Value, Vehicle 1, Price As Compared to Buyer XX | Dealer E Rank Value, Vehicle 2, Price As Compared to Buyer XX | Dealer F Rank Value, Vehicle 1, Price As Compared to Buyer XX | Dealer F Rank Value, Vehicle 2, Price As Compared to Buyer XX | Dealer G Rank Value, Vehicle 1, Price As Compared to Buyer XX | Dealer G Rank Value, Vehicle 2, Price As Compared to Buyer XX |
|---|---|---|---|---|---|---|---|
|  |  |  |  |  |  | 4,099.72 | 3,644.36 |
|  |  |  |  |  |  | 543.78 | 247.71 |
|  |  |  |  |  |  |  |  |
|  |  | 2,355.87 |  |  |  |  |  |
|  |  |  | 1,814.95 |  |  |  |  |
|  |  |  |  |  |  |  |  |
|  |  | 2,245.33 | 1,780.06 |  |  |  |  |
|  |  |  |  |  |  |  |  |
| 1,664.73 |  | 4,572.93 | 3,916.79 |  |  |  |  |
|  | 2,616.36 |  |  |  |  |  |  |
|  |  |  |  |  |  | 7,264.08 | 6,726.13 |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  | 7,605.23 | 6,932.79 |
|  |  |  |  |  |  | 2,500.17 | 2,115.93 |

FIG. 7B

NORMALIZED DEALERSHIP RANKING

| Buyer Name - 2020 XYZ, Model X, Trim Sport Hybrid, Any Exterior Color, Any Interior Color, Optional Packages: None, Dealer-Installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | | | | |
| ZA | 20,700.00 | 4.00 | 2.00 | 1.00 | | | |
| KH | 21,200.00 | | | | | | |
| CJ | 19,000.00 | | | | | | |
| LM | 23,000.00 | | | 1.00 | 5.00 | | 2.00 |
| JL | 24,000.00 | | | 1.00 | 2.00 | | |
| VZ | 23,788.00 | | | 1.00 | | | |
| TH | 24,200.00 | 2.00 | 1.00 | | | | |
| NO | 20,980.00 | | | | | | |
| TV | 23,200.00 | | | 1.00 | 5.00 | | 3.00 |
| NR | 23,750.00 | 2.00 | 1.00 | | | | |
| MG | 21,222.00 | | | | | | |
| SB | 20,965.00 | | | | | | |
| GW | 24,111.00 | | | | | 6.00 | 1.00 |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | 1.00 | | | |
| BZ | 20,145.00 | | | | | | |

FIG. 8A

NORMALIZED DEALERSHIP RANKING

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX |
|---|---|---|---|---|---|---|---|
|  |  |  |  |  |  | 3.00 | 4.00 |
|  |  |  |  |  |  | 3.00 | 5.00 |
|  |  | 3.00 |  |  |  |  |  |
|  |  |  | 4.00 |  |  |  |  |
|  |  |  |  |  |  |  |  |
|  |  |  |  |  |  |  |  |
|  |  | 2.00 | 4.00 |  |  | 3.00 | 4.00 |
|  |  |  |  |  |  |  |  |
|  |  |  |  |  |  |  |  |
|  | 4.00 | 2.00 | 3.00 |  |  |  |  |
|  |  |  |  |  |  |  |  |
|  |  |  |  |  |  |  |  |
| 5.00 |  |  |  |  |  | 1.00 | 3.00 |
|  |  |  |  |  |  | 3.00 | 5.00 |
|  |  |  |  |  |  |  |  |

FIG. 8B

DEALERSHIP & BUYER RANKING

Buyer Name - 2020 XYZ, Model X, Trim Sport Hybrid, Any Exterior Color, Any Interior Color, Optional Packages: None, Dealer-Installed Accessories

| ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,845.00 | 2.00 | 1.00 | | | | |
| ZA | 20,700.00 | 4.00 | 2.00 | | 1.00 | | |
| KH | 21,200.00 | | | | | | |
| O | 19,000.00 | | | | | | |
| LM | 23,000.00 | | | 5.00 | 1.00 | | 2.00 |
| JL | 21,000.00 | | | 2.00 | 1.00 | | |
| VZ | 22,788.00 | | | | 1.00 | | |
| TH | 24,200.00 | 2.00 | 1.00 | | | | |
| NO | 20,980.00 | | | | | | |
| TV | 23,200.00 | | | 5.00 | 1.00 | | 3.00 |
| NR | 23,750.00 | 2.00 | 1.00 | | | | |
| MG | 21,222.00 | | | | | | |
| SB | 20,965.00 | | | | | 6.00 | 1.00 |
| GW | 24,111.00 | | | | | | |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | | 1.00 | | |
| BZ | 20,145.00 | | | | | | |

FIG. 9A

DEALERSHIP & BUYER RANKING

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| | | | | | | 3.00 | 4.00 | 14 |
| | | | | | | 5.00 | 5.00 | 1 |
| | | | | | | | | 20 |
| | | | 3.00 | | | | | 9 |
| | | | | | | | | 13 |
| | | | 4.00 | | | | | 10 |
| | | | | | | | | 6 |
| | | | | | | 3.00 | 4.00 | 12 |
| | | | 4.00 | | | | | 3 |
| | | 2.00 | | | | | | 4 |
| | | | | | | | | 8 |
| | | | 3.00 | | | | | 5 |
| | | | | | | | | 11 |
| | | 2.00 | | | | | | 2 |
| | 5.00 | 4.00 | | | | | | 16 |
| | | | | | | 1.00 | 3.00 | 19 |
| | | | | | | 3.00 | 5.00 | 18 |
| | | | | | | | | 17 |
| | | | | | | | | 7 |
| | | | | | | | | 15 |

FIG. 9B

SALE 1 TO BUYER RANK 1

| Buyer Name - 2020 XYZ, Model X, Trim Sport Hybrid, Any Exterior Color, Any Interior Color, Optional Packages: None, Dealer-installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | - | - | - | - |
| ZA | 20,700.00 | 4.00 | 2.00 | 1.00 | - | - | - |
| KH | 21,200.00 | - | - | - | - | - | - |
| CJ | 19,000.00 | - | - | - | - | - | - |
| LM | 23,000.00 | - | - | 5.00 | 1.00 | - | 2.00 |
| IL | 24,000.00 | - | - | 2.00 | 1.00 | - | - |
| VZ | 23,788.00 | - | - | - | 1.00 | - | - |
| TH | 24,200.00 | 2.00 | 1.00 | - | - | - | - |
| NO | 20,980.00 | - | - | - | - | - | - |
| TV | 23,200.00 | - | - | 5.00 | 1.00 | - | 3.00 |
| NR | 23,750.00 | 2.00 | 1.00 | - | - | - | - |
| MG | 21,222.00 | - | - | - | - | - | - |
| SB | 20,965.00 | - | - | - | - | - | - |
| GW | 24,111.00 | - | - | - | - | 6.00 | 1.00 |
| DM | 19,999.00 | - | - | - | - | - | - |
| JP | 20,664.00 | - | - | - | - | - | - |
| LS | 12,000.00 | - | - | - | - | - | - |
| MA | 23,542.00 | 4.00 | 2.00 | - | - | - | - |
| AS | 22,101.00 | 4.00 | 2.00 | 1.00 | - | - | - |
| BZ | 20,145.00 | - | - | - | - | - | - |

Step 1: ZA bought Dealer B's 2nd Vehicle for $20,700 - Dealer receives $20,491 (Dealer's price: $18,989)

FIG. 10A

SALE 1 TO BUYER RANK 1

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | - | 4.00 | 14 |
| - | - | - | - | - | - | - | 5.00 | 1 |
| - | - | - | - | - | - | - | - | 20 |
| - | - | 3.00 | - | - | - | - | - | 9 |
| - | - | - | 4.00 | - | - | - | - | 13 |
| - | - | - | - | - | - | - | - | 10 |
| - | - | - | - | - | - | 3.00 | - | 6 |
| - | - | 2.00 | - | - | - | - | 4.00 | 12 |
| - | - | - | 4.00 | - | - | - | - | 3 |
| - | - | - | - | - | - | - | - | 4 |
| 5.00 | - | - | - | - | - | - | - | 8 |
| - | 4.00 | 2.00 | - | - | - | - | - | 5 |
| - | - | 1.00 | 3.00 | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | 1.00 | 3.00 | 18 |
| - | - | - | - | - | - | 3.00 | 5.00 | 17 |
| - | - | - | - | - | - | - | - | 7 |
| - | - | - | - | - | - | - | - | 15 |

FIG. 10B

SALE 2 TO BUYER RANK 2

Buyer Name - 2020 XYZ Model X
Trim Sport Hybrid, Any Exterior Color,
Any Interior Color, Optional Packages:
None, Dealer-Installed Accessories:

| | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| ANY | | | | | | | |
| AA | 22,850.00 | 2.00 | 1.00 | | | | |
| ZA | 20,700.00 | 4.00 | 2.00 | 1.00 | | | 2.00 |
| KH | 21,200.00 | | | | | | |
| CJ | 19,000.00 | | | | | | |
| LM | 23,000.00 | | | 5.00 | 1.00 | | |
| JL | 24,000.00 | | | 2.00 | 1.00 | | |
| VZ | 23,788.00 | | | | 1.00 | | |
| TH | 24,200.00 | 2.00 | 1.00 | | | | |
| NO | 20,980.00 | | | 5.00 | | | 3.00 |
| TV | 23,200.00 | | | | 1.00 | | |
| NR | 23,750.00 | 2.00 | 1.00 | | | | |
| MG | 21,222.00 | | | | | | |
| SB | 20,965.00 | | | | | | |
| GW | 24,111.00 | | | | | 6.00 | 1.00 |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | | 1.00 | | |
| BZ | 20,143.00 | | | | | | |

Step 2: GW bought Dealer C's 2nd
Vehicle for $24,111 - Dealer receives
$23,812 (Dealer's price: $20,800)

REJECTION OF BUYER RANK 3

| Buyer Name - 2020 XYZ, Model X, Trim Sport Hybrid, Any Exterior Color, Any Interior Color, Optional Packages: None, Dealer-Installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | | | | |
| ZA | 20,700.00 | 4.00 | 2.00 | | 3.00 | | |
| KH | 21,200.00 | | | | | | |
| CJ | 19,000.00 | | | | | | |
| LM | 23,000.00 | | | 5.00 | | 1.00 | |
| JL | 24,000.00 | | | 2.00 | | 1.00 | |
| VZ | 23,788.00 | | | | | 1.00 | |
| TH | 24,200.00 | 2.00 | 1.00 | | | | |
| TV | 23,200.00 | | | 5.00 | 1.00 | | 3.00 |
| NR | 23,750.00 | 2.00 | 1.00 | | | | |
| MG | 21,222.00 | | | | | | |
| SB | 20,965.00 | | | | | | |
| GW | 24,111.00 | | | | | 6.00 | 3.00 |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | | 1.00 | | |
| BZ | 20,145.00 | | | | | | |

Step 3: NO - got rejected for their bid of $20,980

FIG. 12A

REJECTION OF BUYER RANK 3

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | 3.00 | 4.00 | 14 |
| - | - | - | - | - | - | 3.00 | 5.00 | 1 |
| - | - | - | - | - | - | - | - | 20 |
| - | - | 3.00 | 4.00 | - | - | - | - | 9 |
| - | - | - | - | - | - | - | - | 13 |
| - | - | - | - | - | - | - | - | 10 |
| - | - | - | - | - | - | - | - | 6 |
| - | - | 2.00 | 4.00 | - | - | 3.00 | 4.00 | 12 |
| - | - | - | - | - | - | - | - | 4 |
| - | - | - | - | - | - | - | - | 8 |
| 5.00 | 4.00 | 2.00 | 3.00 | - | - | - | - | 5 |
| - | - | - | - | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | - | - | 18 |
| - | - | - | - | - | - | 1.00 | 3.00 | 17 |
| - | - | - | - | - | - | 3.00 | 5.00 | 7 |
| - | - | - | - | - | - | - | - | 15 |

FIG. 12B

SALE 3 TO BUYER RANK 4

| Buyer Name - 2020 XYZ, Model X, Trim Sport Hybrid, Any Exterior Color, Any Interior Color, Optional Packages: None, Dealer-Installed Accessories: | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| ANY | | | | | | | |
| AA | 22,850.00 | 2.00 | 1.00 | | | | |
| ZA | 20,700.00 | 4.00 | 2.00 | 1.00 | | | 2.00 |
| KH | 21,200.00 | | | | | | |
| CJ | 19,000.00 | | | | | | |
| LM | 23,000.00 | | | 1.00 | | | |
| JL | 24,000.00 | | | 5.00 | 1.00 | | |
| VZ | 23,788.00 | | | 2.00 | 1.00 | | |
| TH | 24,200.00 | 2.00 | 1.00 | | 1.00 | | |
| NO | 20,980.00 | | | | | | 3.00 |
| TV | 23,200.00 | | | 5.00 | 1.00 | | |
| NR | 23,750.00 | 2.00 | 1.00 | | | | |
| MG | 21,222.00 | | | | | | |
| SB | 20,965.00 | | | | | 6.00 | 6.00 |
| GW | 24,111.00 | | | | | | |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | 1.00 | | | |
| BZ | 20,145.00 | | | | | | |

Step 4 - TV bought Dealer E's 1st Vehicle for $23,200 - Dealer receives $22,901 (Dealer's price: $20,850)

FIG. 13A

SALE 3 TO BUYER RANK 4

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | 3.00 | 4.00 | 14 |
| - | - | - | - | - | - | 3.00 | 5.00 | 1 |
| - | - | - | - | - | - | - | - | 20 |
| - | - | 3.00 | - | - | - | - | - | 9 |
| - | - | - | 4.00 | - | - | - | - | 13 |
| - | - | - | - | - | - | - | - | 10 |
| - | - | - | - | - | - | 3.00 | 4.00 | 6 |
| - | 4.00 | - | - | - | - | - | - | 12 |
| - | - | 2.00 | 4.00 | - | - | - | - | 3 |
| 5.00 | - | - | 3.00 | - | - | - | - | 4 |
| - | - | 2.00 | - | - | - | - | - | 8 |
| - | - | - | - | - | - | - | - | 5 |
| - | - | - | - | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | 1.00 | 3.00 | 18 |
| - | - | - | - | - | - | 3.00 | 5.00 | 17 |
| - | - | - | - | - | - | - | - | 7 |
| - | - | - | - | - | - | - | - | 15 |

FIG. 13B

REJECTION OF BUYER RANK 5

| Buyer Name - 2020 XYZ Model X Trim Sport Hybrid, Any Exterior Color, Any Interior Color, Optional Packages None, Dealer-installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | | | | |
| ZA | 20,700.00 | 4.00 | 2.00 | 3.00 | | | |
| KH | 21,200.00 | | | | | | |
| CJ | 19,000.00 | | | | | | |
| LM | 23,000.00 | | 5.00 | 1.00 | | | 2.00 |
| JL | 24,000.00 | | 2.00 | 1.00 | | | |
| VZ | 23,788.00 | | | 1.00 | | | |
| TH | 24,200.00 | 2.00 | 1.00 | | | | |
| ND | 20,980.00 | | | | | | |
| TY | 23,200.00 | | 5.00 | 1.00 | | | 3.00 |
| NR | 23,750.00 | 2.00 | 1.00 | | | | |
| MG | | | | | | | |
| SB | 20,965.00 | | | | | | |
| GW | 24,111.00 | | | | 6.00 | | 1.00 |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | 1.00 | | | |
| BZ | 20,145.00 | | | | | | |

Step 5: MG got rejected for their bid of $21,222.

FIG. 14A

REJECTION OF BUYER RANK 5

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | 3.00 | 4.00 | 14 |
| - | - | 3.00 | - | - | - | 3.00 | 5.00 | 1 |
| - | - | - | - | - | - | - | - | 20 |
| - | - | - | 4.00 | - | - | - | - | 9 |
| - | - | - | - | - | - | - | - | 13 |
| - | - | - | - | - | - | - | - | 10 |
| - | - | - | - | - | - | - | - | 6 |
| - | - | 3.00 | - | - | - | 3.00 | 4.00 | 12 |
| 5.00 | 4.00 | 2.00 | 4.00 | 3.00 | - | - | - | 3 |
| - | - | - | - | - | - | - | - | 4 |
| - | - | - | - | - | - | - | - | 8 |
| - | - | - | - | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | 1.00 | 3.00 | 18 |
| - | - | - | - | - | - | 3.00 | 5.00 | 17 |
| - | - | - | - | - | - | - | - | 7 |
| - | - | - | - | - | - | - | - | 15 |

FIG. 14B

REJECTION OF BUYER RANK 6

| Buyer Name - 2020 XYZ Model X, Trim Sport Hybrid, Any Exterior Color, Any Interior Color, Optional Packages: None, Dealer-installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | | 1.00 | | | |
| ZA | 20,700.00 | 4.00 | | 2.00 | | 3.00 | |
| KH | 21,200.00 | | | | | | |
| CJ | 19,000.00 | | | | | | |
| LM | 23,000.00 | | | | 5.00 | 1.00 | 2.00 |
| JL | 24,000.00 | | | | 2.00 | 1.00 | |
| TH | 24,200.00 | 2.00 | | 1.00 | | | |
| XO | 20,980.00 | | | | | | 3.00 |
| TY | 23,200.00 | | | | 5.00 | 1.00 | |
| NR | 23,750.00 | 2.00 | | 1.00 | | | |
| MG | 21,222.00 | | | | | | |
| SB | 20,965.00 | | | | | | |
| GW | 24,111.00 | | | | | 6.00 | |
| DM | 19,999.00 | | | | | | |
| JP | 20,664.00 | | | | | | |
| LS | 12,000.00 | | | | | | |
| MA | 23,542.00 | 4.00 | 2.00 | | | 1.00 | |
| AS | 22,101.00 | 4.00 | 2.00 | | | | |
| BZ | 20,145.00 | | | | | | |

Step 6: VZ got rejected for their bid of $23,786

FIG. 15A

REJECTION OF BUYER RANK 6

| Dealer D Rank. Vehicle 1. Price As Compared to Buyer XX | Dealer D Rank. Vehicle 2. Price As Compared to Buyer XX | Dealer E Rank. Vehicle 1. Price As Compared to Buyer XX | Dealer E Rank. Vehicle 2. Price As Compared to Buyer XX | Dealer F Rank. Vehicle 1. Price As Compared to Buyer XX | Dealer F Rank. Vehicle 2. Price As Compared to Buyer XX | Dealer G Rank. Vehicle 1. Price As Compared to Buyer XX | Dealer G Rank. Vehicle 2. Price As Compared to Buyer XX | Buyer Rank |
|---|---|---|---|---|---|---|---|---|
| - | - | - | - | - | - | - | 4.00 | 14 |
| - | - | - | - | - | - | 3.00 | 5.00 | 1 |
| - | - | - | - | - | - | - | - | 20 |
| - | - | - | - | - | - | - | - | 9 |
| - | - | 3.00 | 4.00 | - | - | - | - | 13 |
| - | 4.00 | 2.00 | - | - | - | - | - | 10 |
| - | - | 2.00 | 3.00 | - | - | - | - | 12 |
| - | - | - | - | - | - | 3.00 | 4.00 | 3 |
| 5.00 | - | - | - | - | - | - | - | 4 |
| - | - | 4.00 | - | - | - | - | - | 8 |
| - | - | - | - | - | - | - | - | 5 |
| - | - | - | - | - | - | - | - | 11 |
| - | - | - | - | - | - | - | - | 2 |
| - | - | - | - | - | - | - | - | 16 |
| - | - | - | - | - | - | 1.00 | 3.00 | 19 |
| - | - | - | - | - | - | 3.00 | 5.00 | 18 |
| - | - | - | - | - | - | - | - | 17 |
| - | - | - | - | - | - | - | - | 7 |
| - | - | - | - | - | - | - | - | 15 |

FIG. 15B

SALE 4 TO BUYER RANK 7

Buyer Name - 2020 XYZ Model X
Trim Sport Hybrid, Any Exterior Color, Any Interior Color, Optional Packages: None, Dealer-Installed Accessories:

| ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | - | - | - | - |
| ZA | 20,700.00 | 4.00 | 2.00 | - | - | - | - |
| KH | 21,200.00 | - | - | - | - | - | - |
| CJ | 19,000.00 | - | - | - | - | - | - |
| LM | 23,000.00 | - | - | 5.00 | 1.00 | - | 2.00 |
| JL | 24,000.00 | - | - | 2.00 | 1.00 | - | - |
| VZ | 23,788.00 | - | - | - | 1.00 | - | - |
| TH | 24,200.00 | 2.00 | 1.00 | - | - | - | - |
| NO | 20,900.00 | - | - | - | - | - | - |
| TV | 23,200.00 | - | - | 5.00 | 1.00 | - | 3.00 |
| NR | 23,750.00 | 2.00 | 1.00 | - | - | - | - |
| MG | 21,222.00 | - | - | - | - | - | - |
| SB | 20,965.00 | - | - | - | - | - | - |
| GW | 24,111.00 | - | - | - | - | 6.00 | 3.00 |
| DM | 19,999.00 | - | - | - | - | - | - |
| JP | 20,664.00 | - | - | - | - | - | - |
| LS | 12,000.00 | - | - | - | - | - | - |
| MA | 23,542.00 | 4.00 | 2.00 | - | - | - | - |
| AS | 22,101.00 | 4.00 | 2.00 | - | - | 1.00 | - |
| BZ | 20,145.00 | - | - | - | - | - | - |

Step 7: AS bought Dealer A's 2nd Vehicle for $22,101. Dealer receives $21,802 (Dealer's price: $19,500)

FIG. 16A

SALE 4 TO BUYER RANK 7

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | - | 4.00 | 14 |
| - | - | - | - | - | - | 3.00 | 5.00 | 1 |
| - | - | - | - | - | - | - | - | 20 |
| - | - | 3.00 | 4.00 | - | - | - | - | 9 |
| - | - | - | - | - | - | - | - | 13 |
| - | - | - | - | - | - | - | - | 10 |
| - | - | - | - | - | - | - | 4.00 | 6 |
| - | - | 5.00 | - | - | - | 3.00 | - | 12 |
| 4.00 | - | - | - | - | - | - | - | 3 |
| - | - | 2.00 | 3.00 | - | - | - | - | 4 |
| - | - | - | - | - | - | - | - | 8 |
| - | - | - | - | - | - | - | - | 5 |
| - | - | - | - | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | - | - | 18 |
| 5.00 | - | - | - | - | - | 1.00 | 3.00 | 17 |
| - | - | - | - | - | - | 3.00 | 5.00 | 7 |
| - | - | - | - | - | - | - | - | 15 |

FIG. 16B

SALE 5 TO BUYER RANK 8

| Buyer Name - 2020 XYZ, Model X, Trim Sport Hybrid, Any Exterior Color, Any Interior Color, Optional Packages: None, Dealer-Installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | | | | |
| ZA | 20,700.00 | 4.00 | 2.00 | | | | 2.00 |
| KH | 21,200.00 | | | | | | |
| CJ | 19,000.00 | | | | | | |
| LM | 23,000.00 | | | 5.00 | 1.00 | | |
| JL | 24,000.00 | | | 2.00 | 1.00 | | |
| VZ | 23,788.00 | | | | 1.00 | | |
| TH | 24,200.00 | 3.00 | 1.00 | | | | |
| NO | 20,980.00 | | | | | | 3.00 |
| TV | 23,200.00 | 2.00 | 1.00 | 5.00 | 1.00 | | |
| SR | 23,750.00 | | | | | 6.00 | 6.00 |
| MG | 21,222.00 | | | | | | |
| SB | 20,965.00 | | | | | | |
| CW | 24,111.00 | | | | | 6.00 | |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 2.00 | | 1.00 | | |
| BZ | 20,145.00 | | | | | | |

Step 8: NR bought Dealer A's 1st Vehicle for $23,750 - Dealer receives $23,451 (Dealer's price $20,000)

FIG. 17A

SALE 5 TO BUYER RANK 8

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | 3.00 | 4.00 | 14 |
| - | - | - | - | - | - | 3.00 | 5.00 | 1 |
| - | - | - | - | - | - | - | - | 20 |
| - | - | - | 4.00 | - | - | - | - | 9 |
| - | - | 3.00 | - | - | - | - | - | 13 |
| - | - | - | - | - | - | - | - | 10 |
| - | - | - | - | - | - | - | - | 6 |
| - | - | 3.00 | 4.00 | - | - | 3.00 | 4.00 | 12 |
| - | - | - | - | - | - | - | - | 3 |
| - | 4.00 | 2.00 | 3.00 | - | - | - | - | 4 |
| 5.00 | - | - | - | - | - | - | - | 8 |
| - | - | - | - | - | - | - | - | 5 |
| - | - | - | - | - | - | - | - | 11 |
| - | - | - | - | - | - | - | - | 2 |
| - | - | - | - | - | - | 1.00 | 3.00 | 16 |
| - | - | - | - | - | - | 3.00 | 5.00 | 19 |
| - | - | - | - | - | - | - | - | 18 |
| - | - | - | - | - | - | - | - | 17 |
| - | - | - | - | - | - | - | - | 7 |
| - | - | - | - | - | - | - | - | 15 |

FIG. 17B

REFECTION OF BUYER RANK 9

| Buyer Name - 2020 XYZ, Model X, Trim Sport Hybrid, Any Exterior Color, Any Interior Color, Optional Packages: None, Dealer-Installed Accessories: ANY | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| AA | 22,850.00 | 2.00 | 1.00 | - | - | - | - |
| ZA | 20,700.00 | 4.00 | 2.00 | - | 2.00 | - | 2.00 |
| KH | 21,300.00 | - | - | - | - | - | - |
| LM | 23,000.00 | - | - | 5.00 | 1.00 | - | - |
| JL | 24,000.00 | - | - | 2.00 | 1.00 | - | - |
| VZ | 23,788.00 | - | - | - | 1.00 | - | - |
| TH | 24,200.00 | 2.00 | 1.00 | - | - | - | - |
| NO | 20,980.00 | - | - | - | - | - | 3.00 |
| TV | 23,200.00 | - | 1.00 | 5.00 | 1.00 | - | - |
| NR | 23,750.00 | 3.00 | - | - | - | - | - |
| MG | 21,222.00 | - | - | - | - | - | - |
| SB | 20,965.00 | - | - | - | - | - | - |
| GW | 24,111.00 | - | - | - | - | 6.00 | 1.00 |
| DM | 19,999.00 | - | - | - | - | - | - |
| JP | 20,664.00 | - | - | - | - | - | - |
| LS | 12,000.00 | - | - | - | - | - | - |
| MA | 23,542.00 | 4.00 | 2.00 | - | - | - | - |
| AS | 22,101.00 | 4.00 | 2.00 | - | 1.00 | - | - |
| BZ | 20,145.00 | - | - | - | - | - | - |

Step 9: CJ got rejected for their bid of $19,000

FIG. 18A

REJECTION OF BUYER RANK 9

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
| - | - | - | - | - | - | - | 4.00 | 14 |
| - | - | - | - | - | - | - | 5.00 | 1 |
| - | - | - | - | - | - | - | - | 20 |
| - | - | 3.00 | - | - | - | - | - | 13 |
| - | - | - | 4.00 | - | - | - | - | 10 |
| - | - | - | - | - | - | - | 4.00 | 6 |
| - | - | 3.00 | - | - | - | 3.00 | - | 12 |
| - | - | - | 4.00 | - | - | - | - | 3 |
| - | - | 2.00 | - | - | - | - | - | 4 |
| 4.00 | - | - | 3.00 | - | - | - | - | 8 |
| - | - | 2.00 | - | - | - | - | - | 5 |
| - | - | - | - | - | - | - | - | 11 |
| - | - | - | - | - | - | - | - | 2 |
| - | - | - | - | - | - | - | - | 16 |
| - | - | - | - | - | - | - | - | 19 |
| - | - | - | - | - | - | - | - | 18 |
| 5.00 | - | - | - | - | - | 1.00 | 3.00 | 17 |
| - | - | - | - | - | - | 3.00 | - | 7 |
| - | - | - | - | - | - | - | - | 15 |

FIG. 18B

SALE 6 TO BUYER RANK 10

| Buyer Name - 2020 XYZ, Model X, Trim Sport Hybrid, Any Exterior Color, Any Interior Color, Optional Packages: None, Dealer-Installed Accessories: | Buyer Bid | Dealer A Rank, Vehicle 1, Price As Compared to Buyer XX | Dealer A Rank, Vehicle 2, Price As Compared to Buyer XX | Dealer B Rank, Vehicle 1, Price As Compared to Buyer XX | Dealer B Rank, Vehicle 2, Price As Compared to Buyer XX | Dealer C Rank, Vehicle 1, Price As Compared to Buyer XX | Dealer C Rank, Vehicle 2, Price As Compared to Buyer XX |
|---|---|---|---|---|---|---|---|
| ANY | | | | | | | |
| AA | 22,850.00 | 2.00 | 1.00 | | | | |
| ZA | 20,700.00 | 4.00 | 2.00 | | | | |
| KH | 21,200.00 | | | | | | |
| CJ | 19,000.00 | | | | | | |
| LM | 23,000.00 | | | 3.00 | 1.00 | | 2.00 |
| JL | 24,000.00 | | | 2.00 | 1.00 | | |
| VZ | 23,788.00 | | | | 1.00 | | |
| TH | 24,200.00 | 2.00 | 1.00 | | | | |
| NO | 20,980.00 | | | | | | |
| TV | 23,200.00 | | 1.00 | 3.00 | 1.00 | | 3.00 |
| NR | 23,750.00 | 3.00 | | | | | |
| MG | 21,222.00 | | | | | | |
| SB | 20,965.00 | | | | | | |
| GW | 23,111.00 | | | | | 6.00 | 3.00 |
| DM | 19,999.00 | | | | | | |
| JP | 20,664.00 | | | | | | |
| LS | 12,000.00 | | | | | | |
| MA | 23,542.00 | 4.00 | 2.00 | | | | |
| AS | 22,101.00 | 4.00 | 3.00 | | 1.00 | | |
| BZ | 20,145.00 | | | | | | |

Step 10: JL bought Dealer B's 1st Vehicle for $24,000 - Dealer receives $23,701 (Dealer's price $22,000)

FIG. 19A

SALE 6 TO BUYER RANK 10

| Dealer D Rank, Vehicle 1, Price As Compared to Buyer XX | Dealer D Rank, Vehicle 2, Price As Compared to Buyer XX | Dealer E Rank, Vehicle 1, Price As Compared to Buyer XX | Dealer E Rank, Vehicle 2, Price As Compared to Buyer XX | Dealer F Rank, Vehicle 1, Price As Compared to Buyer XX | Dealer F Rank, Vehicle 2, Price As Compared to Buyer XX | Dealer G Rank, Vehicle 1, Price As Compared to Buyer XX | Dealer G Rank, Vehicle 2, Price As Compared to Buyer XX | Buyer Rank |
|---|---|---|---|---|---|---|---|---|
|  |  |  |  |  |  |  |  | 6 |
|  |  |  |  |  |  |  |  | 12 |
|  |  |  |  |  |  |  | 4.00 | 3 |
|  |  | 3.00 |  |  |  | 3.00 |  | 4 |
|  | 4.00 |  |  |  |  |  |  | 8 |
|  |  |  |  |  |  |  |  | 5 |
| 5.00 |  | 2.00 | 3.00 |  |  |  |  | 11 |
|  |  |  |  |  |  |  |  | 2 |
|  |  |  |  |  |  |  |  | 16 |
|  |  |  |  |  |  |  |  | 19 |
|  |  |  |  |  |  | 1.00 | 3.00 | 18 |
|  |  |  |  |  |  | 3.00 | 5.00 | 17 |
|  |  |  |  |  |  |  |  | 7 |
|  |  |  |  |  |  |  |  | 15 |

FIG. 19B

SUMMARY

| Buyer Name - 2020 XYZ, Model X, Trim Sport Hybrid, Any Exterior Color, Any Interior Color, Optional Packages: None, Dealer-Installed Accessories: ANY | Accept/Reject | Buyer Bid | Price to Dealer | Dealer's Lowest Acceptable Price | Dealer/Vehicle | Distance (Search Radius) | Dealer Name - 2020 XYZ, Model X, Trim Sport Hybrid, Any Exterior Color, Any Interior Color, Optional Packages: None, Dealer-Installed Accessories: ANY, MSRP: $26,000 | Address/ZIP C. | Price | Price to Dealer | Result |
|---|---|---|---|---|---|---|---|---|---|---|---|
| AA | Accept | 22,350.00 | 22,551.00 | 20,150.00 | Dealer G, 2nd Vehicle | 60 (75) | Dealer A, Vehicle 1 | XXX | Fairfax | 20,000.00 | 23,451.00 | Sold |
| GW | Accept | 24,111.00 | 23,812.00 | 20,800.00 | Dealer C, 2nd Vehicle | 27 (250) | Dealer A, Vehicle 2 | XXX | Fairfax | 19,500.00 | 21,802.00 | Sold |
| JL | Accept | 24,000.00 | 23,701.00 | 22,000.00 | Dealer B, 1st Vehicle | 26 (100) | Dealer B, Vehicle 1 | XXX | Raleigh | 22,000.00 | 23,701.00 | Sold |
| CM | Accept | 23,000.00 | 22,701.00 | 21,275.00 | Dealer E, 2nd Vehicle | 332 (200) | Dealer B, Vehicle 2 | XXX | Raleigh | 18,900.00 | 20,401.00 | Sold |
| NO | Accept | 23,750.00 | 23,451.00 | 20,000.00 | Dealer A, 1st Vehicle | 182 (200) | Dealer C, Vehicle 1 | XXX | Spartanb | 23,000.00 | N/A | Not Sold |
| TH | Accept | 24,200.00 | 23,901.00 | 19,850.00 | Dealer G, 1st Vehicle | 32 (50) | Dealer C, Vehicle 2 | XXX | Spartanb | 20,800.00 | 23,812.00 | Sold |
| PX | Accept | 23,200.00 | 22,901.00 | 20,850.00 | Dealer E, 1st Vehicle | 292 (350) | Dealer D, Vehicle 1 | XXX | Roswell | 22,500.00 | N/A | Not Sold |
| LA | Accept | 20,700.00 | 20,401.00 | 18,900.00 | Dealer B, 3rd Vehicle | 400 (1,000) | Dealer D, Vehicle 2 | XXX | Roswell | 21,750.00 | N/A | Not Sold |
| AS | Accept | 22,101.00 | 21,802.00 | 19,850.00 | Dealer A, 2nd Vehicle | 103 (250) | Dealer E, Vehicle 1 | XXX | Asheville | 20,850.00 | 22,901.00 | Sold |
| BZ | Reject | 20,145.00 | N/A | | | N/A (500) | Dealer E, Vehicle 2 | XXX | Asheville | 21,275.00 | 22,701.00 | Sold |
| CJ | Reject | 19,000.00 | N/A | | | N/A (500) | Dealer F, Vehicle 1 | XXX | Lexingto | 25,000.00 | N/A | Not Sold |
| DM | Reject | 19,999.00 | N/A | | | N/A (300) | Dealer F, Vehicle 2 | XXX | Lexingto | 23,600.00 | N/A | Not Sold |
| JP | Reject | 20,664.00 | N/A | | | N/A (100) | Dealer G, Vehicle 1 | XXX | Silver S | 19,850.00 | 23,901.00 | Sold |
| KH | Reject | 21,200.00 | N/A | | | N/A (250) | Dealer G, Vehicle 2 | XXX | Silver S | 20,150.00 | 22,551.00 | Sold |
| LS | Reject | 12,000.00 | N/A | | | N/A (50) | | | | | | |
| MA | Reject | 23,542.00 | N/A | | | N/A (25) | Dealers submitted 14 vehicles for sale, 9 of these vehicles were instantly sold. | | | | | |
| MG | Reject | 21,222.00 | N/A | | | N/A (150) | | | | | | |
| NO | Reject | 20,980.00 | N/A | | | N/A (250) | | | | | | |
| SB | Reject | 20,965.00 | N/A | | | N/A (75) | | | | | | |
| XZ | Reject | 23,788.00 | N/A | | | N/A (25) | | | | | | |

FIG. 20 sold involves the seller listing a price for the goods/services and a potential customer either agreeing to that price or counteroffering with a lower price until the parties agree on

SYSTEM AND METHOD OF MATCHING REVERSE AUCTION BUYER BIDS TO SELLER OFFERS

CROSS REFERENCE TO RELATED APPLICATIONS

This application is a continuation of U.S. patent application Ser. No. 16/600,239, filed Oct. 11, 2019, the contents of which is incorporated herein by reference in its entirety.

BACKGROUND

A traditional manner in which goods or services may be sold involves the seller listing a price for the goods/services and a potential customer either agreeing to that price or counteroffering with a lower price until the parties agree on a price or no sale occurs. Auctions are another way to potentially arrive at an agreed price for the sale of a good or service. During a basic auction, no price is initially specified by the seller and buyers offer competing bids until no further bids are made, at which point the sale is made to the highest bidder. In some cases, a minimum price may be specified by the seller, such that the auction does not start until at least one bidder offers at least the minimum price. In other cases, the seller may specify a reserve (which is often not disclosed to the bidders). If the reserve is not met, even though a minimum price may have been offered, the highest bid will not be accepted. The bidders in an auction may be anonymous.

A reverse auction operates on similar principles to an auction, but in reverse, where the sellers may be anonymous (until a buyer's successful bid is accepted), a buyer may offer a price they are willing to pay, and different sellers bid against one another to match the offered price. Matching different sellers to a single buyer may be complicated by a number of factors, depending on the nature of the good or service being sold, especially when a distance between a buyer and seller is a factor or many different buyers and sellers are participating, and different offers and bids are constantly being made. For example, EP2615575 discloses the utilization of a coverage area to determine which buyers could be involved in a reverse auction service. U.S. Pat. Publ. No. 2015/0081467 discloses the use of a geographical location associated with a user, that may be specified by the user, and the user of a time of receipt of bids that may be used to rank different bids in terms of priority. Similarly, U.S. Pat. Publ. No. U.S. 2010/0250444 discloses a user narrowing a search criterion by entering the location of a good in terms of miles from the user's location. Other references factor in location is some manner or another. For example, U.S. Pat. Publ. No. U.S. 2009/0138374 discloses the use of the location of a courier being provided as part of a seller profile to identify acceptable sellers, and U.S. Pat. Publ. No. U.S. 2008/0177653 discloses the use of a distance to customers and a distance to a final destination to filter sellers.

With respect to the sale of goods that are also available for sale over the Internet, other factors add to the complexity. For example, with respect to motor vehicles, customers frequently pre-shop online and do not contact dealerships until they have obtained detailed pricing information from multiple sources, such as CARDIRECT and CARGURU, which puts them in the position of being able to confidently name the price they are willing to pay for a specific vehicle. Dealerships may be disadvantaged in at least two ways: (1) they likely make less money on in demand vehicles; and (2) they have less opportunity to interest potential buyers in other vehicles that may be harder to sell. Buyers may still be disadvantaged as well because the dealership may not be willing to sell at the price they are willing to pay, which may force the buyer to travel to many different dealerships over a large geographic area in what may be a vain attempt to find a willing seller.

A number of online vehicle sale facilitation companies have attempted to address these problems. TRUECAR and COSTCO offer pre-negotiated prices for certain vehicles to their members through established networks of dealerships. With respect to COSTCO, a single dealership is chosen per retail facility and members are offered a single price for selected vehicles available from the dealership. The dealership pays a fee to COSTCO in return for each vehicle sold. While this may save COSTCO members money, the customers have no ability to name a different price or purchase a vehicle other than those in the program and the dealerships are limited to the vehicles they may offer. Other online vehicle sale facilitation companies, such as AUTOBIDSONLINE provide paying members an option to submit a price bid on a vehicle they would like to purchase, which is then passed on to participating dealerships, where it is entirely up to them to accept, reject or counter the submitted customer bid. There is no guarantee any response from a dealership may be generated, so the price paid to participate may be wasted, and there is no certainty that the price originally bid will be the final selling price.

This may be a particular problem for last-minute vehicle buyers when attempting to do comparison shopping. Such buyers have an urgency to purchase a vehicle in a day or two and are forced to put time, effort and money (e.g., buyer-to-dealership commute expenses) into visiting various dealerships during a very short period. Likewise, these last-minute vehicle buyers have limited time to engage in email and telephone correspondence with dealers to negotiate their desired vehicle prices and mitigate some of those commute-related expenses to dealerships. Higher transaction costs coupled with a choice constraint, where buyers have only a few available price comparison platform alternatives (e.g., TRUECAR (pre-negotiated), COSTCO (pre-negotiated and limited choices in terms of make and model)) effectively inflate the price of vehicle ownership and may dissuade some shoppers from buying new vehicles and prompt them to switch to less expensive used vehicle alternatives. This framework of poor matching design due to extra costs results in a larger static portion of the inventory (fewer sales than what should have taken place otherwise) due to foregone customers who would have purchased new vehicle in the absence of such transaction costs.

All of the solutions discussed above have shortcomings that limit widespread adoption of the respective services. There is no sophisticated buyer-to-dealer instant matching being utilized to facilitate the buyer-to-dealership transaction. Instead, dealerships are forced to publicly display their pricing information in order to participate, which can cause them to lose sticker-price paying customers, even on popular vehicles within a given geographical area, which deters some dealerships from participating and forces the dealerships to engage in more costly advertising to attract would be buyers. The extra advertisement expenses represent additional transaction costs that could be avoided with a proper online point-of-sale medium mechanism. Moreover, some in-network dealerships may even cap new vehicle discounts due to symmetric information that is immediately available to other buyers who will use this discount information during their conventional face-to-face negotiations at the dealership to obtain deals that are similar, or better, then those online price quotes. Hence, some dealerships will have reservations as to what degree they would be willing to extend their discounts, even on those vehicles that they need to turn over relatively quickly. This iterative negative dealership thought process will result in unrealized consumer savings and lower inventory turnover rates relative to the optimum levels for the dealerships, thereby increasing dealership costs and reducing their ability to reward their hardworking employees with larger bonuses. Finally, price quotes provided by third-party/online companies may still be treated as target estimates prompting price negotiations and causing emotional burden on consumers and dealerships alike. Consequently, all such shortcomings limit the use of the described services in some manner.

Current computer technology is not equipped to solve the above noted problems when scaled on a national level. When tens of thousands of buyers are simultaneously submitting bids for tens of thousands of vehicles from thousands of dealerships at the same time, chaos can ensue unless steps are taken to distinguish which buyer's bids get priority over other buyer's bids, which vehicles offered by different dealerships get priority for sale over other identical vehicles offered by other dealerships, and the inventory is managed in real-time as thousands of transactions proceed. In particular, as the nature of vehicle sales involve geographic limitations that make them particular unsuitable for more typical Internet-based sales, current computer technology is not equipped to determine how best to match the thousands of bids to the thousands of offered at least in part based on distance determinations between each buyer and each dealership of a potential transaction.

Based on the above, it is evident that vehicle buyers need to be able to submit their own desired prices into any online or physical medium to potentially be instantly matched to a dealership and in order to complete the entire new car purchase transaction. At the same time, dealerships need quick inventory turnover rates and the reduced opportunity cost of using a third-party online medium to sell certain models much faster than it would otherwise take to sell these models through their own dealership. A dealership's lot is constrained in terms of car spaces that are available. If a certain number of vehicles are sitting on their lot without materializing into quick sales, those models take space from the models that would have been already sold and turned into profit.

SUMMARY

Systems and methods are disclosed for matching buyers to dealers of the same type of vehicle. Buyer bids are ranked based on receipt time. Buyers specify a search radius corresponding to dealers. Dealer offers correspond to an acceptable amount for the vehicle. A high price is computed for each vehicle from dealers relative to buyers based on dealer offers and MSRP. A final price is computed for each vehicle based on dealer offers, the search radius, and the high price. Final prices are ranked based on the distance from buyer to dealer and the buyer bid dealer offer difference. The match is based on the highest rank final price for the corresponding dealer to an earliest received buyer bid that has not been matched if the vehicle offered by the corresponding dealer is available.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings.

FIG. 1 illustrates a plurality of hypothetical buyer bids for a specified vehicle in accordance with an embodiment.

FIG. 2 illustrates a plurality of hypothetical dealership price offers and initial price computations for vehicles matching the buyers' specifications in accordance with an embodiment.

FIG. 3A and FIG. 3B illustrate dealership final price computations for the specified vehicle in accordance with an embodiment.

FIG. 4 illustrates a search radius check to identify dealerships within a search radius specified by each buyer in accordance with an embodiment.

FIG. 5A and FIG. 5B illustrate final price computations for dealerships within the search radius specified by each buyer and the elimination of dealership final price computations not within the search radius in accordance with an embodiment.

FIG. 6A and FIG. 6B illustrate a price comparison between the remaining dealership final price computations and the elimination of dealership final price computations that exceed a buyer's bid in accordance with an embodiment.

FIG. 7A and FIG. 7B illustrate a raw ranking of dealership pricing based on a distance computation and a price differential in accordance with an embodiment.

FIG. 8A and FIG. 8B illustrate a normalized ranking of dealership pricing based on FIG. 7A and FIG. 7B in accordance with an embodiment.

FIG. 9A and FIG. 9B illustrate a comparison between normalized dealership ranking and buyer bid ranking in accordance with an embodiment.

FIG. 10A and FIG. 10B illustrate conditions resulting in a sale of a first vehicle to a first buyer in accordance with an embodiment.

Figure 11B:
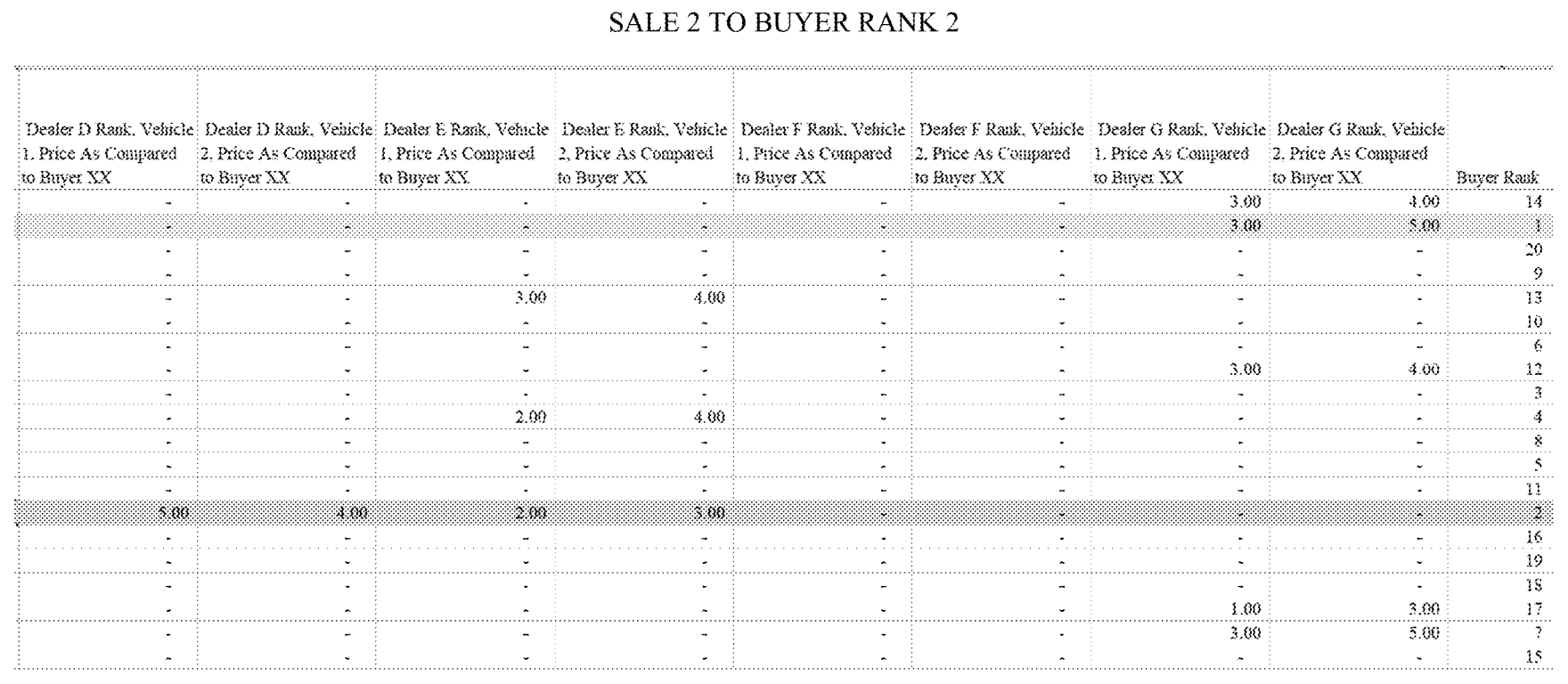

FIG. 11A and FIG. 11B illustrate conditions resulting in a sale of a second vehicle to a second buyer in accordance with an embodiment.

FIG. 12A and FIG. 12B illustrate conditions resulting in rejection of a third buyer's bid for the specified vehicle in accordance with an embodiment.

FIG. 13A and FIG. 13B illustrate conditions resulting in a sale of a third vehicle to a fourth buyer in accordance with an embodiment.

FIG. 14A and FIG. 14B illustrate conditions resulting in rejection of a fifth buyer's bid for the specified vehicle in accordance with an embodiment.

FIG. 15A and FIG. 15B illustrate conditions resulting in rejection of a sixth buyer's bid for the specified vehicle in accordance with an embodiment.

FIG. 16A and FIG. 16B illustrate conditions resulting in a sale of a fourth vehicle to a seventh buyer in accordance with an embodiment.

FIG. 17A and FIG. 17B illustrate conditions resulting in a sale of a fifth vehicle to an eighth buyer in accordance with an embodiment.

FIG. 18A and FIG. 18B illustrate conditions resulting in rejection of a ninth buyer's bid for the specified vehicle in accordance with an embodiment.

FIG. 19A and FIG. 19B illustrate conditions resulting in a sale of a sixth vehicle to a tenth buyer in accordance with an embodiment.

FIG. 20 is a summary with respect to the plurality of buyers and the plurality of dealerships resulting in the sale of a vehicle or the rejection of a buyer's bid in accordance with an embodiment.

DETAILED DESCRIPTION OF ILLUSTRATIVE EMBODIMENTS

Figure 21:
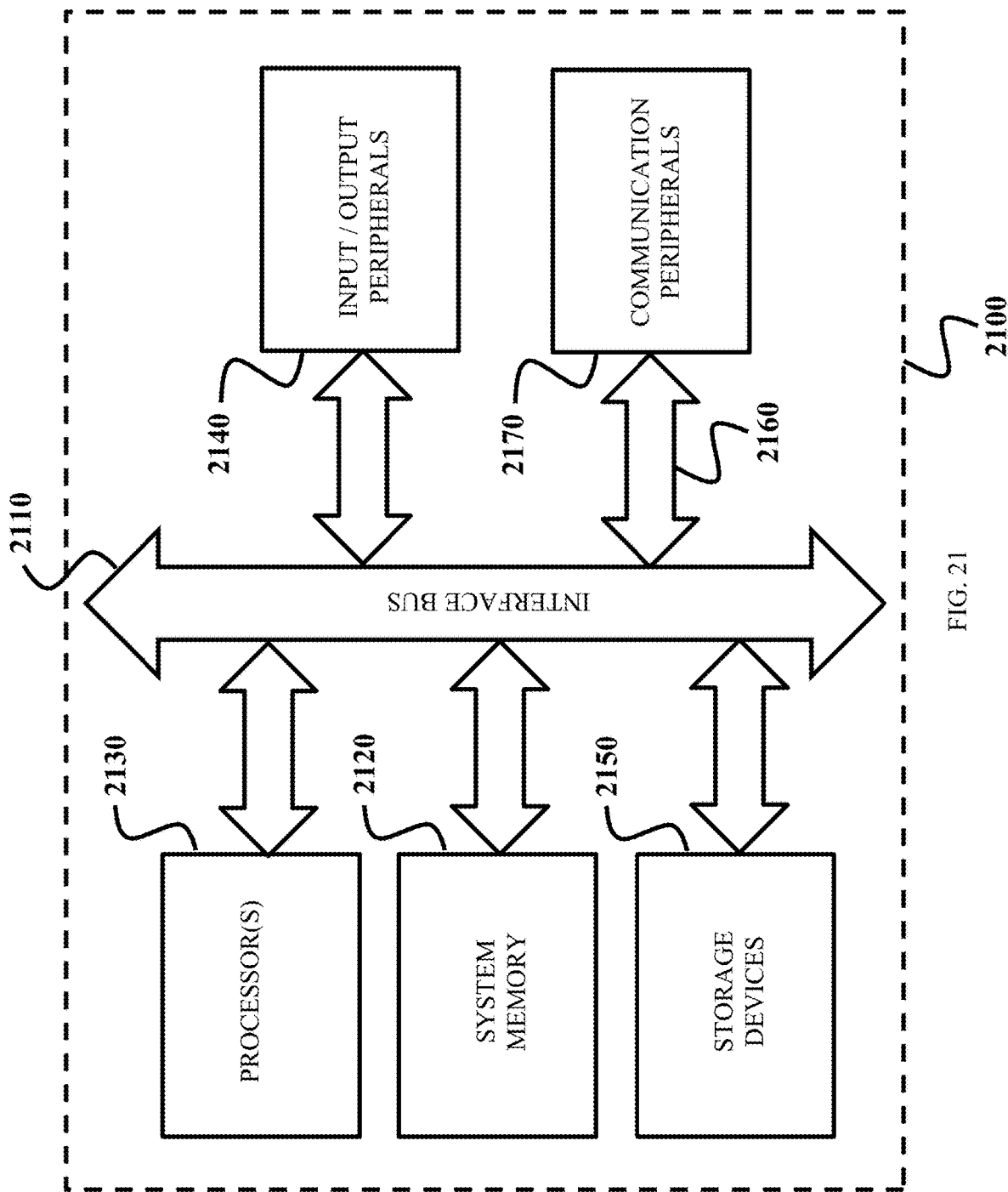
FIG. 21 is an illustration of an exemplary computing environment in accordance with embodiments.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of the present disclosure.

The present disclosure is directed to methods and system for a reverse auction matching mechanism that has particular, but not exclusive, applicability to purchased, leased and subscribed vehicles. Whether the transaction is a purchase, lease or subscription, the transaction is referred to herein as a "sale", and whether a customer becomes an actual buyer, completes a lease or subscription, or never consummates any transaction, the customer is referred to herein as a "buyer", in each case for simplicity purposes. Likewise, the seller of a vehicle is referred to herein as a "dealer" or "dealership" regardless of whether they are actually a vehicle dealership or a private seller of some type, and the vehicle being offered or sold is referred to herein as a vehicle, regardless of whether it is a passenger car, a truck, a commercial vehicle, a motorcycle, or any other type of vehicle.

The reverse auction sales mechanism of the present disclosure protects the identity of a dealership, and therefore their pricing information, by keeping the dealership name confidential through an opaque design of the matching service until the sale is complete. The system also enables dealerships to use a static inventory management method that increases the turnover of the static portion of their new car inventory. At the same time, the matching process places pricing control in the hands of consumers to enable them to name their own price, which is then matched to the aggressively discounted vehicles held by the anonymous dealerships, thereby allowing consumers to extract the maximum amount of savings for every transaction completed through the mechanism.

As further described herein, in an embodiment, a logarithmic function may be used to meet both of the dealership and consumer objectives. More specifically, the decreasing rate of the increasing logarithmic function's curvature (in order to reflect desirable characteristics of the discounted price-distance elasticity of vehicle demand) may be used to rank and compare dealership price quotes to consumer price bids and to successfully facilitate the matching process. This design may empower price-conscious buyers to potentially buy their cars at prices they are willing to pay and allow dealerships to effortlessly and anonymously turn over their inventory at an agreeable price.

The computer network interface for dealerships may include a sign-in window with the toll-free number provided for dealership registration purposes. Once the dealership registers, the dealership may be issued a unique Dealer Code and a Dealer ID and may begin to synchronize their inventory with the system's dealership management system (DMS) to enable the dealership to view their vehicles and to list those vehicles the dealership wants to sell through the system. Many dealerships manage their inventory through third-party DMS platforms, which may be synchronized with the system. A dealership may also manually enter their inventory without relying on DMS platforms.

A dealership may select as many vehicles as they like from their listed inventory to sell through the system. For each selected vehicle, the dealership may then enter its "absolute lowest price" and if applicable, add mileage and vehicle condition disclosures for vehicles with high odometer readings (e.g., greater than 125 miles) or known-to-dealership blemishes (e.g., scruff marks, small scratches, etc.). The "absolute lowest price" may include the price of the vehicle, any dealer-initiated fee, such as documentation fees, destination fees, the price of optional packages and dealership-installed accessories (if applicable), and all other fees that the dealership may charge for the specific make and model of vehicle, including dealership-locate fees for out-of-stock vehicles. The only fees that may be excluded from the "absolute lowest price" total are non-dealer-initiated fees, such as state taxes, title fees, licensing fees, and other state and government fees or charges.

Because supply and demand may differ between different vehicles, dealerships may price discriminate between their selected vehicles based upon market conditions, floor planning, and inventory management valuations and strategies. Dealerships may also set different prices for the exact same type of vehicle. Since each vehicle may be uniquely identified by its respective vehicle identification number (VIN), even otherwise identical vehicles may have different prices at the discretion of the dealership, and since the dealerships are not identified until the sale is concluded, dealerships are not harmed by doing so, which allows the dealership to address local supply and demand changes.

If a dealership inputs an absolute lowest price for a particular vehicle model and the system matches a buyer to that vehicle at that exact price, then the dealership must honor the absolute lowest price it entered without adding any other fees to the buyer's total (except state taxes, title fees, licensing fees, and other state and government charges). Likewise, if a dealership sold a stripped-down vehicle model (i.e., no dealership-installed accessories or optional packages), that dealership must be fully prepared to sell that stripped-down vehicle model at a price that is equal to the amount of a successfully submitted bid (which will be at least equal to the amount of the absolute lowest price specified by the dealership) without any further dealership-installed accessories or optional packages added onto that vehicle, although the buyer may have the option of paying such extras in addition to their successfully submitted price bid.

Upon entering prices and any applicable vehicles' disclosure-related information, dealerships will review their order specifications and input their assigned Dealer Code to submit selected vehicles to the system. At any time, dealerships may be able to monitor real-time sales information occurring within the system on a dealership dashboard. The dealership dashboard may list the number of vehicles the dealership currently has on sale through the system (with View and Edit options), as well as the dealership's total sales within the past 24 hour and 14 day periods, or other periods if desired. Dealerships will also be able to view through the dashboard all of their sales history, view or print specific transactions, and manage profile information on two levels (admin and salesperson).

As further described below, as soon as a dealership has input a vehicle's information and a corresponding price quote and a buyer has submitted a bid for the vehicle within a certain search radius, a dynamic database/server may be configured to convert the dealership price into comparative price for purposes of identifying a match to the buyer's bid. If the system identifies a match, the dynamic database may automatically update the dealerships' inventory through the system and the dealership's DMS so as to prevent duplicate sales for the same vehicle. Every single dynamic database entry (e.g., historic data, contact and payment information) may be stored securely on a server and may be further utilized to customize other system features, such as implementing a variance analysis estimation that provides dealerships with probability estimates of how quickly the system expects to sell a particular vehicle at an input price.

The computer network interface for buyers may include a registration and sign-in window so a registered buyer can log into an account to review current and past transactions. Registered users may also have access to additional shopping services. Once signed in, a bidding tool may contain one or more drop-down menus configured to enable buyers to select for a vehicle of interest the year, make/brand, model, trim-level, exterior color, and interior color. The lists of exterior/interior colors may include an "ANY" option for buyers flexible about exterior/interior color preferences. Buyers may be able to use checkboxes within the drop-down menus to pick multiple exterior/interior colors. As exterior color(s) are input by the buyer, an automatic update may be performed by the system to provide the buyer with available interior color options for each selected exterior color.

Once all of the make, model and trim-level choices have been entered by the buyer, the system may further provide an additional drop-down menu for optional packages and dealership-installed accessories. The buyer may leave such choices unselected or the buyer may explicitly click on "NONE" (which may also be a default selection) if the buyer is not interested in any optional packages and dealership-installed accessories. Since dealership-installed accessories are not part of the car manufacturing company's official list of options and the availability of dealership-installed accessories are dealership-dependent, a list of commonly found dealership's new-car add-ons may be provided (e.g., mud/splash guards, window tinting, wheel locks, all-season floor mats, roof racks). The buyer may be able to use checkboxes within the drop-down menus to pick multiple optional packages and dealership-installed accessories. The drop-down menu for dealership-installed accessories may be preselected as ANY in order to cause the maximum number of potentially matched vehicles to be made available for matching purposes by the system to buyers for a specified search radius. This may be preferable over leaving buyers with a few limited options (if any) of potentially matched vehicles available given a refined level of specificity for a vehicle of interest. Stated differently, the system may have over twenty 2019 Toyota Camry SE models to potentially match the buyer to one of those vehicles within a hundred mile radius; whereas, there may be only a few or none of the same 2019 Toyota Camry SE with mud-guards, spoiler and window tinting accessories within the same hundred mile search radius. Therefore, while the aforementioned ANY selection may be selected by default, buyers may deselect the ANY selection in favor of selecting one or more dealership-installed accessories.

Upon finalizing the make, model and trim-level choices and all of the desired optional package and dealership-installed accessory choices for a vehicle, the system will take the buyer to the next interface page to input their zip code information. Zip code information may be manually entered or selected from the buyer's saved profile (which can be modified at any time), or the zip code may be automatically picked based on the buyer's current location. Once the zip code has been entered into the appropriate interface box, the buyer may then select a desired search radius using a provided search radius drop-down list. The search radius may include 25, 50, 75, 100, 150, 200, 250, 300, 350, 500, 1,000 and ALL miles or 40, 80, 120, 161, 250, 320, 400, 500, 600, 805, 1,500 and ALL kilometers (within a given country). The buyer may then enter a desired price for the selected vehicle and the anticipated method of payment for the entire vehicle purchase transaction, such as cash/check or financing.

The anticipated method of payment information may be forwarded to dealerships and financing-related disclosure information may be provided to the buyer so that financing customer are appropriately cautioned. Additional terms and conditions may be provided at the same time regarding the vehicle purchase transaction (e.g., financing conditions, time allocations for this transaction, etc.). Buyers may also be informed that a bid does not include state taxes, title and licensing fees and other state and government charges. Those extra charges may be paid directly to the dealership or the department of motor vehicles (DMV), depending on circumstances and state requirements surrounding that particular new vehicle purchase transaction. Potential buyers may be encouraged to apply for loan pre-approval in order to secure the required financing from their preferred lenders prior to submitting their bid, since all successful bids are final and the service and reservation fee may be instantly charged once a match is made, and may be non-refundable even in cases where buyers fail to obtain the required financing due to their own financial circumstances or changing market conditions that may further affect interest rates. Subsequent loan rejections on behalf of either the lender or the borrower due to changes in interest rates or customer's financial circumstances may not qualify as necessary and sufficient conditions for the reimbursement of the non-refundable service and reservation fee.

All of the information and selections entered by the buyer may be stored on a server, and once stored, it may be passed onto the system's dynamic database to trigger the implementation of the matching process, where the buyer's bid will be matched to a vehicle, if a match is available. While the matching process continues, the buyer may be provided a transitory page through the buyer interface informing that buyer that a search for the best possible match is ongoing. If the bid is not accepted (i.e., not matched), the buyer may not be charged the non-refundable service and reservation fee and the buyer may be subject to a waiting period of a predetermined period before the buyer is permitted to resubmit either the same bid or a different bid (amount-wise) for the same vehicle type given the same desired search radius. The waiting period may prevent potential buyers from flooding the system with repeat bids that are not likely to result in a match. Alternatively, the buyer may modify the search radius or the vehicle type to submit their bid again without observing the waiting period.

During the waiting period, one or more security checks may be implemented to prevent buyer's from attempting to avoid the waiting period. One security check may involve comparing the incoming bid's Internet Protocol (IP) address against those that are matched to IPs of bids that have been placed in the waiting period queue. If there is a positive IP-check match, the buyer submitting that bid may be reminded of the waiting period rule and their bid may be rejected. If there is no IP address match, a second security check may be performed that involves the matching of the incoming bid's Full and Last Names, as well as the complete address information (street, street number, unit (if applicable), city, state (if applicable) and zip code) against the corresponding data of those bids that have been placed in the waiting period queue. If there is a positive name-address match, the buyer submitting that bid may be reminded of the waiting period rule and their bid may be rejected.

Upon submission of a successful vehicle bid, the non-refundable service and reservation charge may be immediately charged using payment information provided by the customer and the identity of the dealership providing the matched vehicle may be provided to the customer. Upon the submission of the successful bid, the system may automatically display the amount saved by that customer based on the manufacturer's suggested retail price (MSRP) of the vehicle and their bid pricing information. The MSRP may include all relevant pricing-related information, such as optional package and dealership-installed accessory cost figures, as well as all corresponding fees (e.g., destination and documentation), excluding state taxes, title and licensing fees and other state and government charges. Therefore, the amount saved on a particular successful bid may be computed using either the percentage saved $$\left(100 \times \left(1 - \frac{CB_i}{MSRP}\right)\right)$$

or as a dollar amount saved (MSRP–$CB_i$).

The successful bid transaction may also automatically trigger an inventory update by placing the matched vehicle into the reserved category, at which point that vehicle may be considered to be sold within the system. At that time, the buyer may also be able to view the description of the vehicle, its pricing breakdown and any other relevant information that pertains to their transaction (along with its issued transaction reference number). In addition to providing buyers with the dealership information, the system may also forward transaction-related information pertaining to the vehicle of interest, its pricing, as well as the buyer's contact information and their anticipated method of payment for that vehicle to the matched dealership, so both parties can finalize their transaction. Moreover, in successful match cases, the buyer may have up to a predetermined period, e.g., 14-calendar days, to complete their transaction and finalize the purchase of the vehicle. If the dealership violates that predetermined period and fails to sell the vehicle that was previously approved by the dealership for sale, the dealership may be required to compensate the customer in the amount of the service and reservation charge.

The matching process will now be discussed in greater detail, including a description of a simulated match. The objective of the matching process is to link price-conscious buyers to dealerships to facilitate purchase transactions within a reverse auction environment. While dealerships may sell any vehicle through the disclosed system, in an embodiment, the system may be particularly suited for selling slow moving vehicles, meaning vehicles that stay on a dealership's lot for too long. Typically, in order to move slow moving vehicles, a dealership may be required to advertise the vehicles and offer discounts to bring traffic to the dealership. In doing so, however, the dealership may be disclosing information to the public that can be used against the dealership by aggressive buyers interested in negotiating even lower prices or obtaining discounts on vehicles that are not slow moving vehicles. The reverse auction process allows the dealership to remain anonymous until a buyer's bid has been successful, thereby avoiding the negative aspects of aggressively pricing a vehicle to the public.

In an embodiment, the vehicles listed in the system for the matching process are new vehicles with low test-driven mileage (≤125 miles) having exterior and interior conditions consistent with that of new vehicles, i.e., scratch and dent free with no other visible or invisible to the naked eye blemishes. As previously discussed, for each listed vehicle, the dealership may enter its absolute lowest price, which may include all fees, such as the price of the vehicle, documentation and destination fees, the price of optional packages and dealer-installed accessories (if applicable) and all other fees that dealers may charge for this specific make and model (including dealer-locate fees for out-of-stock vehicles). The only fees that may be excluded from this absolute lowest price total are state taxes, title and licensing fees and other state and government charges. Each vehicle will be uniquely separated by its respective vehicle identification number (VIN) and, thus even identical vehicles can vary in prices at the discretion of dealers due to local supply and demand changes. For the purpose of notation, the overall lowest dealer-inputted price quote (DealerNamedLowPrice$_j$) corresponds to the absolute lowest price for a particular make and model of vehicle.

The system provider may then add an Increment (Increment$^r$) equal to a predetermined amount to be paid to the system provider when a vehicle is sold. The absolute lowest price quote (LPQ$_j$) for a vehicle input by dealership j is therefore:

$$LPQ_j = \text{DealerNamedLowPrice}_j + \text{Increment}^r \quad (1)$$

To create a vector of dealership j prices that may be utilized within the process in order to identify positive buyer-to-dealership matches, a high-price quote (HPQ$_j$) for the dealership j may first be created, in addition to the aforementioned low-price quote (LPQ$_j$). The spread between the absolute lowest price quote (LPQ$_j$) and the high-price quote (HPQ$_j$) may serve as a price array that may be used in the matching process to rank dealership prices and to compare those dealership-derived prices to buyer bids to identify any positive matches. Specifically, whenever there is an incoming buyer bid entered into the system, the system may use the matching process to derive the HPQ for every vehicle of every dealership in its database and then utilize those HPQs to build a vector of dealership prices to be compared to the buyer bid in order to identify any positive matches, as further disclosed below.

As described above, based on dealership input prices, the matching process may use Equation (1) to derive the low-price quote (LPQ$_j$), which may constitute an absolute lowest price quote within the system that is a price equivalent of the absolute lowest price specified by the dealership (in terms of the actual amount that is netted as a result of a system transaction by that dealership in cases where the buyer bid price is equal to LPQ$_j$). In addition to deriving the LPQ$_j$, the matching process may derive the upper bound of the pricing vector for the dealership j, where the upper limit bound will be denoted as $HPQ_j$. Equation (2) may be utilized to derive a preliminary high-price quote for dealership j ($PrelimHighPriceQuote_j$):

$$PrelimHighPriceQuote_j = \begin{cases} PrelimHighPriceQuote_j^{up\ to\ 2} = 0.3 \times MSRP_j + 0.7 \times LPQ_j, \text{ if vehicles} < 3 \\ PrelimHighPriceQuote_j^{3+} = \left(1 - \frac{MSRP_j - LPQ_j}{1.02 \times MSRP_j - LPQ_{min}}\right) \times MSRP_j \\ + \left(\frac{MSRP_j - LPQ_j}{1.02 \times MSRP_j - LPQ_{min}}\right) \times LPQ_j, \text{ if vehicles} \geq 3 \end{cases} \quad (2)$$

The weights are based on how many identical vehicles (fewer than 3, or 3 and greater) are in the unsold inventory. $LPQ_{min}$ corresponds to the lowest priced vehicle out of all identical vehicles entered into the system database. For the purpose of notation, a set of identical vehicles is defined in relation to the vehicle specification as it is entered into the system by the buyer; therefore, if the buyer picks a particular vehicle, such as a 2019 Camry SE with Supersonic Red Exterior and Black Softex Interior colors with an All-Weather Floor Liner Package, then that exact vehicle specification (with the aforementioned exterior and interior colors) may serve as a basis for identical vehicle classification/defining purposes within this hypothetical example.

Conversely, if a buyer picked a 2019 Camry SE without specifying any other parameters, then all 2019 Camry SE vehicles may be lumped into an identical vehicle category for price vector purposes. To compute $LPQ_{min}$, all identical vehicles from all dealerships within the geographic boundaries of a country (where the underlying transaction is taking place) may be pooled and then a vector of $LPQ_j$ prices of these identical vehicles may be sorted across all dealerships (from the first dealership 1 to the last dealership j ($LPQ_1$, $LPQ_2$, . . . , $LPQ_j$) within that country) in an ascending order, where the lowest value of $LPQ_j$ is the desired $LPQ_{min}$. To determine $HPQ_j$, the derived $PrelimHighPriceQuote_j$ price is then checked against the MSRP for dealership j's vehicle (Equation (3)) to eliminate any excessive pricing cases where the upper bound exceeds its respective MSRP:

$$HPQ_j = \begin{cases} PrelimHighPriceQuote_j, \text{ if } PrelimHighPriceQuote_j < MSRP_j \\ LPQ_j, \text{ if } PrelimHighPriceQuote_j \geq MSRP_j \end{cases} \quad (3)$$

The MSRP will correspond to the exact vehicle the dealer j submitted for sale in the system; therefore, if the vehicle includes optional packages and dealership-installed accessories, such extra charges will be included in the MSRP pricing. Moreover, the MSRP will include all fees, such as the price of the vehicle, documentation and destination fees and all other fees that dealerships may charge for this specific make and model (including dealership-locate fees for out-of-stock vehicles). The only fees that will be excluded from this MSRP total are state taxes, title and licensing fees and other state and government charges.

When a price-conscious buyer submits their bid, the location of the buyer may be determined from the zip code provided and the average distance from that zip code to the physical location of the dealership j may be determined. This average distance may then be utilized to determine if a dealership is within buyer specified search radius to be used in the matching process. The search radius options may include: 25, 50, 75, 100, 150, 200, 250, 300, 350, 500, 1,000 and ALL miles or 40, 80, 120, 161, 250, 320, 400, 500, 600, 805, 1,500 and ALL kilometers (within a given country). In addition, the moment the buyer submits their price bid through the system interface, the bid may be immediately associated with a time stamp ($Time_i$), which may be refined to a maximum allowable unit of accuracy, such as nanoseconds, etc. Time stamps are used in the matching process as further explained in the disclosure.

Once the buyer's bid and desired search radius information have been entered into the system, the following process may be utilized to derive the final dealership price quote (FDPQ) that will be compared to the buyer's bid (CB). If the buyer specified a 25-mile/40-kilometer search radius, the HPQs from all the dealerships that fall within that 25-mile/40-kilometer search radius may be utilized. If the buyer specified a 500-mile/805-kilometer (or more) radius, the LPQs from all the dealerships that fall within that 500-mile/805-kilometer search radius may be utilized. If the buyer specified a search radius that falls between the 25 to 500 mile/40 to 805 kilometer radius (25<Distance<500 with respect to miles), the FDPQ to be utilized may be determined based on a three-step process (the process is illustrated using miles for simplification purposes only), the first two steps of which are:

Step 1: Compute the log multiplier search radius ratio ($LMSRR_i$) of the buyer's selected search radius ($CSR_i$) based on equation (4):

$$LMSRR_i = \frac{\ln CSR_i}{\ln 500} = \log_{500} CSR_i \quad (4)$$

Step 2: Compute the final dealer price quote for the 25<Distance<500 search radius based on equation (5).

$$\overline{FDPQ_{ij}} = HPQ_j - LMSRR_i \times (HPQ_j - LPQ_j) \quad (5)$$

$FDPQ_{ij}$ corresponds to the final dealer price quote of dealership j for buyer i that picked the 25<Distance<500 search radius. $HPQ_j$ corresponds to the high price quote of dealership j. $LPQ_j$ corresponds to the low price quote of dealership j.

A third and final step may then be applied regardless of the buyer's selected search radius based on equation (6)

$$DPQ_{ij} = \begin{cases} HPQ_j, \text{ if search radius} = 25 \\ \overline{FDPQ_{ij}}, \text{ if search radius} = 25 < \text{Distance} < 500 \\ LPQ_j, \text{ if search radius} \geq 500 \end{cases} \quad (6)$$

$DPQ_{ij}$ corresponds to the final dealership's price quote of dealership j that may then be compared to bid of buyer i. Accordingly, once the system computes the final dealer price quote ($DPQ_{ij}$), the system juxtaposes those final dealer price quotes with submitted buyer bids to identify possibly successful (i.e., positive) matches. If the system detects a single instance where $CB_i \geq DPQij$ is valid, then that particular $DPQ_i$ may become a positive match and concomitantly a highest ranked dealer price by virtue of its single match property. To turn a single positive match into a successful one, the system may perform an inventory check to validate the match (for bid-involved vehicles, inventory checks may be implemented every second in order to minimize the time attributed to bid matching). If the underlying vehicle of the corresponding dealer price quote is available in the system's inventory, then a positive match may turn into a successful match, which will result in the binding transaction (the buyer will instantly be charged a non-refundable service and reservation fee), where the buyer will be notified that their bid has been accepted, at which time they will be able to view the information on their matched dealership, as well as other transaction-related details.

When there is more than a single positive match, a ranking may be performed of the positive matches. The dealership price ranking may involve a rescaling of $DPQ_{ij}$ to derive dealer rank quotes ($DP_{ij}^{Rank}$) using the following steps to identify the unique positively matched $DPQ_{ij}$.

Step 1: Compute the average distance from the customer to the dealer using the customer provided zip-code based on equation (7):

$$CS_{ij} = CustomerLocation_i - DealerLocation_j \quad (7)$$

$CS_{ij}$ corresponds to the distance of buyer i to dealership j. CustomerLocation$_i$ corresponds to the average computed location based on the zip code location of buyer i.

Step 2: Compute the log multiplier ratio ($LMR_{ij}$) of $CS_{ij}$ based on Equation (8):

$$LMR_{ij} = \frac{\ln CS_{ij}}{\ln 500} = \log_{500} CS_{ij} \quad (8)$$

In the event $CS_{ij} \leq 1.01$, the $CS_{ij}$ is replaced with 1.01 in Equation (8).

Step 3: Compute the rank of dealership price quotes ($DPQ_{ij}^{Rank}$) based on equation (9):

$$DPQ_{ij}^{Rank} = LMR_{ij}^{-1} \times (CB_i - LPQ_j) \text{ for all } CB_i \geq DPQ_{ij} \text{ cases} \quad (9)$$

The system may then check as to whether the highest ranked dealer price and its corresponding vehicle for that bid of buyer i is still available in the inventory. If the vehicle is available, then the positive match may be turned into a successful match, which will result in the binding transaction (the buyer will instantly be charged a non-refundable service and reservation fee), where the buyer will be notified that their bid has been accepted, at which time they will be able to view the information on their matched dealership, as well as other transaction-related details.

Occasionally, the system may end up with two or more $DPQ_{ij}^{Rank}$ ties. To resolve these ties the computed distance from the average deterministic pin-point of the buyer provided zip code (e.g., center point of the zip code) to dealerships may be used. These distances may be further refined to meters, centimeters, millimeters and smaller units until the system identifies which one of the tied dealerships is located closer to the average deterministic pin-point of the customer provided zip code. The $DPQ_{ij}^{Rank}$ with the shortest distance may then be identified as the highest ranked match, and therefore further subject to the inventory check in order to be validated as a successfully matched price for that particular $CB_i$. For instance, if $DPQ_{iabc}^{Rank} = DPQ_{ixyz}^{Rank} = DPQ_{inhg}^{Rank} = 12$, but dealership-to-customer distances are as follows: $\Delta DISTANCEabc = 35.67$, $\Delta DISTANCExyz = 358.44$ and $\Delta DISTANCEnhg = 35.678$, then $DPQ_{iabc}^{Rank} = 12$, $DPQ_{inhg}^{Rank} = 13$ and $DPQ_{ixyz}^{Rank} = 14$.

The abovementioned time stamp may also play a role in buyer rankings. For instance, if two buyers, buyer 1 and buyer 2, each submitted identical bids for an identical vehicle one second apart from each other, and the two buyers were the same distance from a dealership, then the system may compute and rank their matched dealer prices exactly the same. However, because there was a 1 second time difference between the buyer bids, the time stamp may serve as a tie-breaker and thereby identify which buyer ends up with a successful match. Stated differently, if buyer 1 entered their bid one second prior to buyer's 2 bid ($Time_1 = t$ and $Time_2 = t+1$, where t+1 happened after t), then the inventory check may be first applied to buyer 1's highest ranked dealer price and its corresponding vehicle. Consequently, buyer 1's inventory validation step will be successful, turning the highest ranked price match in relation to buyer 1's bid into a successful match (which in turn produces a binding purchase transaction). Furthermore, the system may mark that vehicle as sold, removing it from the system inventory in the process, such that buyer's 2 bid fails the inventory validation procedure, prompting the rejection of the positive match as a result (assuming there are no other positive matches for buyer 2).

As each buyer may have more than one positive match, the rejection of a positive match due to a negative result of the inventory check may not terminate the matching process. Rather, the system may then turn to the second highest ranking dealer to validate the second highest ranking dealer price match through an inventory check. The process may continue until either a successful match has been identified or upon running out of matched prices within that vector, the system will fail to accept any successful matches and reject that bid as an unsuccessful one. In the hypothetical of eight-buyers and four-matched vehicles, if the first buyer's bid has been successfully matched to its highest ranked matched price and its corresponding vehicle, that vehicle, as is explained above, will be marked as sold and removed from the system inventory. The system may continue implementing the same above-detailed steps with respect to the second buyer (as measured by the next earliest time stamp) and other consecutive buyers in accordance with their time stamps, identifying successful matches or rejections. Within the scope of this hypothetical example, the process may continue until all four cars have been marked as sold to four buyers, at which point the system may immediately flag remaining transactions as unsuccessful ones (assuming all four cars are sold).

To further explain the matching process, and in particular how certain buyer bids are ranked relative to one another, a further example is provided and described herein with respect to FIGS. 1-20. The example is set forth in a spreadsheet format for ease of illustration but would not be implemented in this fashion within the system. FIG. 1 illustrates information about a plurality of buyers (in this case 20 buyers) that have all submitted bids for a 2020 XYZ, Model X, with sport hybrid trim, any exterior color, and any interior color, no optional packages, and any dealer-installed accessories. The buyers are identified in 10 by two initials for purposes of this example but would be identified by unique identifications within the system so that no two buyers would ever by identified in the same way. In the example illustrated, all of the buyer bids were submitted on the same day and at the same hour, minute and second 11 so a microsecond format 12 is utilized to time stamp and to rank 13 each buyer in terms of bid submission timing, with buyer ZA ranked first, buyer GW ranked second, . . . and buyer KH ranked twentieth.

The zip code 14 of each buyer is indicated as entered manually (the system may provide an automatic zip code entry option) by the buyer, along with each buyer's indicated search radius 16. A list of dealerships that have submitted cars for sale matching the buyers' submitted bids is provided in FIG. 2 along with addresses and zip codes 20 for each dealership, which may then be utilized to determine the distance 18 from each buyer's zip code 14 to each dealership's address 20. For the location of each buyer for distance determination purposes, a deterministic average dropped pin-point location based on the zip code 14 may be utilized. The distance 18 may be calculated as a straight line from the pin-point location based on the zip code 14 to the dealership address 20. For every buyer, the system may also create a secondary distance computation-related variable ("Distance/SearchRadiusCheck"), which may utilized in ranking Equations (8) and (9)

As further illustrated in FIG. 2 dealerships may input their lowest dealer price 22 for every car they wish to sell on system. The system may then add an Increment to such Lowest Dealer Prices (Equation 1) to derive the low-price quote for each dealership j ($LPQ_j$) 24. As illustrated in FIGS. 2-20, each dealership is shown to have entered two vehicles that meet the buyer search criteria (a vehicle having an MSRP of $26,000), with each vehicle having a different lowest dealer price 22, and therefore different LPQs 24. The system may then dynamically sort a vector of all resulting $LPQ_1$ prices for a given identical vehicle use Equation (2) to determine the PrelimHighPriceQuote (PrelimHPQ) 26. As noted above, if there are least 3 identical vehicles in the database, then the system uses $$PrelimHPQ_j^{3+} = \left(1 - \frac{MSRP_j - LPQ_j}{1.02 \times MSRP_j - LPQ_{min}}\right) \times MSRP_j$$
$$+ \left(\frac{MSRP_j - LPQ_j}{1.02 \times MSRP_j - LPQ_{min}}\right) \times LPQ_j,$$

to determine the PrelimHighPriceQuote$_j$. If there are fewer than 3 identical vehicles, then $$PrelimHPQ_j^{up\ to\ 2} = 0.3 \times MSRP_j + 0.7 \times LPQ_j, \text{ if vehicles} < 3$$

is utilized to determine PrelimHPQ 26. As also noted above with respect to Equation (3), if the PrelimHPQ is less than the MSRP for the vehicle, then the PrelimHPQ prices is used at the high-price quote (HPQ), otherwise the LPQ is used. In the example of FIG. 2, all of the PrelimHPQs are less than the MSRP of $26,000, so each PrelimHPQ is used as the HPQ 28. Also, the HPQ$_j$ may be continually updated as vehicles are matched and sold to buyers.

Based on the LPQ$_j$, the search radius and the continuously updated HPQ$_j$, the dealership final prices may be computed using Equations (4), (5) and (6). For example, with respect to Buyer AA and Dealer A's Vehicle 1, as shown in FIG. 3A, because Buyer AA's search radius is 75 miles (as shown in FIG. 1), which is between 25 and 500 miles, Equations (4) and (5) should be used. According to Equation (4), as applied to Buyer aa and Dealer A's Vehicle 1, LMSRR=ln 75/ln 500=4.317488/6.214608=0.69473216. According to Equation (5), if the search radius is 25<Distance<500, then the final dealer price quote (FDPQ) is HPQ–LMSRR(HPQ–LPQ), so FDPQ=$21,560.52–(0.69473216)×($21,560.52–$20,299.00)=$21,560.52–$876.41=$20,684.10. And, per Equation (6) because the search radius is 25<Distance<500, then FDPQ is used as the final dealer quote (DPQ). However, because Buyer VZ and Buyer MA both had a buyer search radius of 25 miles, the HPQ for Dealer A ($21,560.52) may be used for both as the DPQ. Likewise, because Buyer AZ, Buyer CJ and Buyer BZ each had a buyer search radius of 500 or more miles, the PPQ for Dealer A ($20,299.00) may be used for all three as the DPQ. FIG. 3A and FIG. 3B show DPQs for each buyer with respect to each vehicle offered by Dealers A-G.

As can be seen from the above, the pricing from a dealer is least favorable to a buyer when the search radius is 25 miles or less and more favorable to a buyer when the search radius is 500 miles or more. Between 25 and 500 miles, the pricing is on a sliding scale that becomes more favorable to the buyer as the search radius approaches 500 miles and less favorable to the buyer as the search radius approaches 25 miles.

Once the DPQ for each buyer's bid has been determined, a search radius check may be performed as illustrated in FIG. 4. As shown, if a dealership's distance from a buyer falls within the buyer's selected search radius 16, then the DPQ for that dealership will be accepted, which is indicated by a "1" 40. If a dealership's distance from a buyer falls outside of the buyer's selected search radius 16, then the DPQ for that dealership will be rejected, which is indicated by a "0" 42. The results of the search radius check as applied to the final dealer quotes of FIG. 3A and FIG. 3B are illustrated in FIG. 5A and FIG. 5B, where only accepted DPQs of each dealer continue to be listed for each buyer.

For the remaining DPQs included in the matching process, as illustrated in FIG. 6A and FIG. 6B, the system then compares each buyer's bid price to the remaining DPQs. If a DPQ is less than or equal to the buyer's bid price, the DPQ is accepted and identified as a "positive match". For example, Dealer A's Vehicle 1 for Buyer AA is a positive match because the DPQ of $20,684.10 is less than Buyer AA's bid of $22,850.00. On other hand, Dealer A's Vehicle 1 for Buyer CJ is NOT a positive match because the DPQ of $20,299.00 is more than Buyer CJ's bid of $19,000.00. As can be seen from FIG. 6A and FIG. 6B, where no DPQ for a dealer resulted in a positive match for Buyer CJ's bid of $19,000.00, if a buyer's bid price is too low, the buyer runs the risk of having their bid completely eliminated with respect to all dealers.

As illustrated in FIG. 7A and FIG. 7B, for the remaining DPQs, the system may perform a computed ranking of every positive match based on the distance from a buyer to a dealership and the difference between the buyer's bid and the LPQ for a dealer in accordance with Equations (7)-(9). For example, with respect to Dealer A, Vehicle 1 and Buyer AA, according to Equation (7), as the average distance from Buyer AA to Dealer A is 2.2 miles, then CS=2.2. In the event the average distance from Buyer AA to Dealer A was less than 1.01 miles, then CS=1.01 is used instead. The system may then compute the log multiplier ratio (LMR) of CS for Dealer A and Buyer AA based on Equation (8), which would be (ln CS/ln 500)$^{-1}$, which in this case would (ln 2.2/ln 500)$^{-1}$=7.881983, and multiply the log multiplier ratio by the difference between Buyer AA's bid and Dealer A's LPQ for Vehicle 1, which would be 7.881983×($22,850.00−$20,299.00)=7.881983×2,551.00)=20,106.94. The same formula applied to Buyer AN and Dealer A, Vehicle 1 would be equal to (ln 635/ln 500)×($20,700.00−$19,799.00)=0.962964× 901.00=867.63. As can be seen from FIG. 7A and FIG. 7B, the closer a buyer is to a dealer, the more the distance multiplier enhances the pricing difference between the buyer's bid and the dealer's LPQ. With respect to Buyer AA and Buyer AN, the distance multiplier for Buyer AA was much higher than that of Buyer AN because Buyer AA was only 2.2 miles from Dealer A while Buyer AN was 635 miles from Dealer A. The pricing difference between Buyer AA and Dealer A ($2,551.00) and Buyer AN and Dealer A ($901.00) was also larger, such that once those price differences were multiplied by the multiplier.

As illustrated in FIG. 8A and FIG. 8B, for each buyer, the computed ranking of each remaining dealer may then be converted into a conventional metric, such as a standard ranking notation of 1, 2, 3, etc., to simplify the process. With respect to Buyer AA, for example, Dealer A, Vehicle 2 has the highest rank, followed by Dealer A, Vehicle 1, followed by Dealer G, Vehicle 1, followed by Dealer G, Vehicle 2.

In rare cases where the dealer ranks for two or more dealers are identical, the system may use the average distance (i.e., ΔDistances) as a tie breaker. In such a situation, it may be necessary to refine the distances into infinitesimal units, such that there will always be a shorter distance that is ranked higher (assigned a lower numerical value) than a longer distance. For instance, if $DPQ_{iabc}^{Rack}=DP_{ixyz}^{Rank}=DPQ_{inhg}^{Rank}=2$, but ΔDISTANCEabc=35.67, ΔDISTANCExyz=358.44 and ΔDISTANCEnhg=35.678, then $DPQ_{iabc}^{Rank}=2$, $DPQ_{inhg}^{Rank}=3$ and $DPQ_{ixyz}^{Rank}=4$ and all other ranks that are higher than 4 (before the aforementioned distance tie-breaker check, these dealers were ranked higher than 2) will be numbered accordingly (5, 6, etc.).

As shown in FIGS. 9A and 9B, once the dealers have been ranked with respect to each buyer, the buyer rank of FIG. 1 (which was based on when buyer bids were submitted) may be added (i.e., see the last column in FIG. 9B) to rank the buyers relative to the dealer ranking. As noted above, before any positive match is deemed a successful match, the inventory will be checked (which check may occur automatically and on a continual real-time basis) to make sure a matched vehicle remains available for purchase.

Buyer ranking helps to resolve ties among buyers for any single vehicle offered by a dealership. For example, as shown in FIG. 9A, for Dealer B, Vehicle 2, Buyer ZA, Buyer LM, Buyer JL, Buyer VZ, Buyer TV, and Buyer AS are each ranked with the highest rank positive match. As illustrated in FIGS. 10A and 10B, however, the sale of Dealer B, Vehicle 2 goes to Buyer ZA because Buyer ZA's bid submission was first, even though each of Buyer LM, Buyer JL, Buyer VZ, Buyer TV, and Buyer AS bid a higher amount for the vehicle. For Dealer B, however, Buyer ZA's successful match is still a good deal because Dealer B submitted a dealer's price offer of $18,900.00, but Buyer ZA's bid was $20,700.00. After deduction of the increment (in the example $299.00), Dealer B still receives $20,401.00, which is $1,501.00 more than it was willing to sell vehicle B for in the first place.

Having resolved the highest ranked buyer among the positive matches, the system next turns to the next highest ranked buyer, which is illustrated in FIG. 11A and FIG. 11B, where Buyer GW is ranked second. Dealer C, Vehicle 2 is a positive match dealer ranked 1.00 for Buyer GW (as shown in FIG. 11A and FIG. 11B a numerical value of N.00 is used to indicate ranking, but any indicator may be used to indicate a respective ranking), so after verifying the vehicle remains in the inventory, the positive match is deemed a successful match and that vehicle will be sold to Buyer GW for buyer bid of $24,111.00. Again, the buyer bid of $24,111.00 was more than the dealer offer of $20,800.00, so after deduction of the increment, Dealer C received $23,812.00, which is $3,012.00 more than offered.

Having resolved the second highest ranked buyer among the positive matches, the system next turns to the next highest ranked buyer, which is illustrated in FIG. 12A and FIG. 12B, where Buyer NO is ranked third. Buyer NO's bid of $20,980.00 was eliminated during the price comparison process of FIG. 6A and FIG. 6B because the DPQ of the only potentially matching dealer offers, Dealer C, Vehicle 1 at $23,489.11 and Dealer C, Vehicle 2 at $21,279.69, were both more than Buyer NO's bid of $20,980.00.

As illustrated in FIG. 13A and FIG. 13B, Dealer B, Vehicle 2 is sold to Buyer TV as the fourth ranked buyer bid because Buyer TV's bid is the highest remaining bid that is a positive match for the specified vehicle and the vehicle is still available.

As illustrated in FIG. 14A and FIG. 14B, Buyer MG's bid, as the fifth ranked buyer bid, was rejected because the DPQ of the only potentially matching dealer offers, Dealer E, Vehicle 1 at $21,466.07 and Dealer E, Vehicle 2 at $21,913.07, were both more than Buyer MG's bid of $21,222.00.

As illustrated in FIG. 15A and FIG. 15B, Buyer VZ's sixth ranked buyer bid was rejected, even though the dealer rank for Dealer B, Vehicle 2 was a positive match dealer ranked 1.00 because Dealer B, Vehicle 2 had already been sold to Buyer ZA as described above with respect to FIG. 10A and FIG. 10B. Hence Buyer VZ's bid failed the inventory test.

As illustrated in FIG. 16A and FIG. 16B, Dealer A, Vehicle 2 is sold to Buyer AS as the seventh ranked buyer bid because Buyer AS's bid is the highest remaining bid that is a positive match for the specified vehicle, even though the dealer rank is 2.00 instead of 1.00, and the vehicle is still available. While Dealer B, Vehicle 2 was a positive match dealer ranked 1.00, that vehicle had already been sold to Buyer ZA as noted above. Hence, while the highest dealer ranked vehicle failed the inventory test, the next highest dealer ranked vehicle was still available, so it was sold to Buyer AS.

Similarly, as illustrated in FIG. 17A and FIG. 17B, Dealer A, Vehicle 1 is sold to Buyer NR as the eighth ranked buyer bid because Buyer NR's bid is the highest remaining bid that is a positive match for the specified vehicle, even though the dealer rank is 2.00 instead of 1.00, and the vehicle is still available. While Dealer A, Vehicle 1 was a positive match dealer ranked 1.00, that vehicle had just been sold to Buyer AS as noted above with respect to FIG. 16A and FIG. 16B. Hence, while the highest dealer ranked vehicle failed the inventory test, the next highest dealer ranked vehicle was still available, so it was sold to Buyer NR.

As illustrated in FIG. 18A and FIG. 18B, Buyer CJ's bid, as the ninth ranked buyer bid, was rejected because the DPQ of every potentially matching dealer offer was more than Buyer CJ's bid of $19,000.00.

As illustrated in FIG. 19A and FIG. 19B, Dealer B, Vehicle 1 is sold to Buyer JL as the tenth ranked buyer bid because Buyer JL's bid is the highest remaining bid that is a positive match for the specified vehicle and the vehicle is still available.

Among the remaining buyer bids: Buyer SB's eleventh ranked bid was eliminated as being below the price of any potential matching dealer offer; Buyer TH's twelfth ranked bid was accepted and Dealer G, Vehicle 1 was sold to Buyer TH because the dealer rank of 3.00 was the highest among remaining dealers and the vehicle remained available in inventory; Buyer LM's thirteenth ranked bid was accepted and Dealer E, Vehicle 2 was sold to Buyer LM because the dealer rank of 4.00 was the highest among remaining dealers and the vehicle remained available in inventory; Buyer AA's thirteenth ranked bid was accepted and Dealer G, Vehicle 2 was sold to Buyer AA because the dealer rank of 4.00 was the highest among remaining dealers and the vehicle remained available in inventory; and all of the remaining buyer bids were rejected either because the buyer bids were eliminated during the dealer price comparison process or no positively matched vehicles remained after a failed inventory test.

A summary of all of the successful or rejected transactions is provided in FIG. 20. The summary indicates that out of 14 vehicles that were submitted by the dealerships, 9 of the vehicles were instantly sold and 5 were not. Among the vehicles not sold were Dealer F, Vehicle 1 and Vehicle 2, which were the two highest priced dealer offers at $25,000.00 and $23,600.00, respectively. The three remaining unsold vehicles, Dealer C, Vehicle 1, Dealer D, Vehicle 1, and Dealer D, Vehicle 2 were dealer ranked 6.00, 5.00 and 4.00, respectively, and did not sell because each vehicle was only a positive match for one buyer, Buyer GW and Buyer GW bought Dealer A, Vehicle 2 instead, which had a lower dealer offer than the unsold vehicles.

FIG. 21 illustrates an exemplary computing environment in which embodiments of the present disclosure is depicted and generally referenced as computing environment 2100, which may be implemented in a variety of environments, including a cloud service. As utilized herein, the phrase "computing system" generally refers to a dedicated computing device with processing power and storage memory, which supports operating software that underlies the execution of software, applications, and computer programs thereon. As shown by FIG. 21, computing environment 2100 includes interface bus 2110 that directly or indirectly couples the following components: system memory 2120, one or more processors 2130, input/output (I/O) peripherals 2140, one or more storage devices 2150, and network interface 2160 which may be connected to any of the components, including communication peripherals 2170. Interface bus 2110 is configured to communicate, transmit, and transfer data, controls, and commands between the various components of computing environment 2100.

Computing environment 2100 typically includes a variety of computer-readable media. Computer-readable media can be any available media that is accessible by computing environment 2100 and includes both volatile and nonvolatile media, removable and non-removable media. Computer-readable media may comprise both computer storage media, such as through storage devices 2150, and communication media, such as through communications peripherals 2170. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information, and which can be accessed by computing environment 2100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

System memory 2120 includes computer-storage media in the form of volatile and/or nonvolatile memory. The memory may be removable, non-removable, or a combination thereof. Memory 2120 may be implemented using hardware devices such as solid-state memory, hard drives, optical-disc drives, and the like. Computing environment 2100 also includes one or more processors 2130 that read data from various entities such as memory 2120, I/O peripherals 2140, and network interface 2160.

I/O peripherals 2140 enables computing environment 2100 to communicate with different input devices and output devices. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 2130 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O peripherals 2140 is configured to coordinate I/O traffic between memory 2120, the one or more processors 2130, network interface 2160, and any combination of input devices and/or output devices.

Network interface 2160 enables computing environment 2100 to exchange data with other computing devices via any suitable network. In a networked environment, program modules depicted relative to computing environment 2100, or portions thereof, may be stored in a remote memory storage device accessible via network interface 2160. It will be appreciated that the network connections shown are exemplary and other means of establishing a communications link between the computers may be used.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the disclosure may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data. It will be appreciated that the various features and processes described above may be used independently of one another or may be combined in various ways. All possible combinations and sub-combinations are intended to fall within the scope of this disclosure.

As discussed above, dealerships may be aware that any discounts for vehicles that they publish on third-party mediums (other than the present system) are not guaranteed to turn into a binding transaction for the sale of a vehicle. It may be just as likely that a buyer takes the posted discounts and use that information to further negotiate new vehicle price breaks with another dealership that may be willing to beat the discounts, or even in person at the same dealership. Therefore, dealerships may always have reservations about revealing their true lowest prices for their available vehicles. These asymmetric market conditions may produce overinflated prices relative to the optimum market environment where buyer-to-dealer matches are conducted in the absence of such frictions. Higher prices will lead to lower sales volumes, resulting in larger than desired inventory of new cars (i.e., the "static inventory problem").

The above-described system provides at least one solution to at least the static inventory problem. The system enables a steep discount to be offered by dealerships in exchange for a binding transaction and requiring buyers to prepay a nonrefundable portion of a vehicle transaction price based on a price that the buyer is truly willing to pay. The resulting matching process is opaque; meaning that buyers only see their matched dealership's identity once the transaction is complete and they have prepaid a nonrefundable portion of their price for their desired vehicle. This pricing information or the obtained deal specifically, under this environment, cannot be used against any other dealership to get an even better price on the desired vehicle without causing the buyer to forfeit the nonrefundable portion of the price (prepayment). Moreover, the dealership's true lowest price is never revealed to anyone. While a dealership submits a true lowest price they are willing to accept, that information is only used as part of the matching process and does not necessarily reflect the price at which the vehicle may be sold. The protection of this information serves to prevent potential buyers from using system-originated deal-related information in order to further advance their negotiation tactics.

There are also transactional uncertainties that surround a buyer's potential vehicle purchase and until a buyer finalizes a deal to buy a vehicle, signs the purchase paperwork and drives the vehicle off the dealership's premises (or has the vehicle delivered to them), there is no assurance that the contemplated transaction will materialize in its entirety exactly as expected. Market conditions may rapidly change, and the buyer may experience a scenario where the vehicle they were looking to buy at a steep discount may have been already sold to someone else while they are still negotiating with a dealership. Another problematic scenario may entail the buyer obtaining a pre-negotiated pricing through a third-party medium, only to realize, upon their arrival, that the specifications of the price pre-negotiated vehicle may not be exact and those, however minor, differences may still prompt further time-consuming negotiations. Any added uncertainty and/or increases in transaction costs will further balloon the effective price of that vehicle's ownership and may dissuade a portion of buyers from purchasing those new vehicles in favor of less expensive used vehicle alternatives (again, the static inventory problem).

The disclosed system solves these problems by creating an instant and binding transaction. Buyers are required to prepay a nonrefundable portion of their price and have a limited period in which to pick up their reserved vehicle. At the same time, the system's rigorous matching process minimizes the aforementioned uncertainties by automatically generating a successful transaction when a successful match is identified. Stated differently, if the buyer knows the price they are willing to pay for their desired vehicle, under ideal settings, there should not be any additional transaction costs tacked on to that price. This calculus is reflected in the rigorous design of the system platform that facilitates instant and binding transactions at points buyers submit their purchase requests.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for matching a buyer among a plurality of buyers to a seller among a plurality of sellers, comprising:
receiving, at a dynamic database, buyer information comprising a buyer bid and a search radius from a first computer interface from each buyer among the plurality of buyers, wherein the buyer bid corresponds to an amount each buyer is willing to pay for a purchase of a service having a type, a unique identification and a suggested price, wherein the search radius corresponds to a maximum distance between each buyer and any seller related to the purchase of the service, wherein the dynamic database is configured to securely store real-time buyer, seller, and transactional information and automatically update seller inventory based on transactional information at a server;

recording a time stamp for each buyer bid, wherein the time stamp corresponds to a time at which each buyer bid was received from the first computer interface;

receiving, at the dynamic database, seller information comprising a lowest price from a second computer interface from each seller among the plurality of sellers, the lowest price corresponding to an amount each seller is willing to accept for sale of the service;

in response to receiving the buyer information and the seller information, initiating a matching process at the dynamic database to convert each seller price into a comparative price to identify a matching seller and buyer bid, and if a match is identified, automatically updating, by the dynamic database, the seller inventory in real-time based on transactional information, to prevent duplicate sales, the matching process comprising:

automatically computing through a processor a high price for each service from each seller relative to each buyer based on each lowest price and the suggested price, wherein the high price is more than the lowest price if the high price is less than the suggested price and the high price is the same as the lowest price if the high price is greater than or equal to the suggested price;

automatically computing through the processor a final price for each service from each seller relative to each buyer based on each lowest price, each search radius, and each high price, wherein when the search radius is a low distance setting the final price as the high price, wherein when the search radius is a high distance setting the final price as the low price, and wherein when the search radius is between the low distance and the high distance setting the final price according to:

$$\overline{FDPQ_{ij}} = HPQ_j - LMSRR_i \times (HPQ_j - LPQ_j)$$

wherein $\overline{FDPQ_{ij}}$ is the final price of a seller j for a buyer i within a greater than the low distance and less than the high distance search radius, wherein $HPQ_j$ is the high price automatically computed for the seller j for the buyer i within the low distance search radius, wherein $LMSRR_i$ is a log multiplier search radius ratio in miles for the buyer i, and wherein $LPQ_j$ is the low price of the seller j for the buyer i within a greater than or equal to the high distance search radius;

automatically computing through the processor a ranking of each final price based on a distance from a corresponding buyer to a corresponding seller and a difference between the buyer bid of the corresponding buyer and the lowest price of the corresponding seller; and automatically matching a highest rank final price for the corresponding seller to an earliest received buyer bid that has not been matched if the service offered by the corresponding seller is available, wherein an identity of the corresponding seller is hidden from the buyer until the match between the corresponding seller and the buyer has been successfully completed; and updating the dynamic database, in real-time, with the matching seller and buyer bid.

2. The method as recited in claim 1, wherein the highest rank final price is equal for two corresponding sellers, ranking a corresponding seller closest to the corresponding buyer higher than a corresponding seller further away from the corresponding buyer.

3. The method as recited in claim 1, wherein the distance from the corresponding buyer to the corresponding seller is based on a zip-code provided by the corresponding buyer through the first computer interface and an address provided by the corresponding seller through the second computer interface.

4. The method as recited in claim 3, wherein a location of the zip-code is based on an average computed location based on the zip-code.

5. The method as recited in claim 1, wherein computing through the processor the ranking includes computing a log multiplier ratio according to:

$$LMR_{ij} = \frac{\ln CS_{ij}}{\ln 500} = \log_{500} CS_{ij}$$

wherein $LMR_{ij}$ corresponds to the log multiplier ratio for the corresponding buyer i and the corresponding seller j, and wherein $CS_{ij}$ corresponds to the distance in miles from the corresponding buyer i to the corresponding seller j.

6. The method as recited in claim 5, wherein $CS_{ij}$ is 1.01 in the event the distance from the corresponding buyer i to the corresponding seller j is less than or equal to 1.01.

7. The method as recited in claim 5, wherein computing through the processor the ranking further includes when the buyer bid of the corresponding buyer i is greater than or equal to the final price of the corresponding seller j for the corresponding buyer i computing a rank of each final price according to:

$$DPQ_{ij}^{Rank} = LMR_{ij}^{-1} \times (CB_i - LPQ_j) \text{ for all } CB_i \geq DPQ_{ij} \text{ cases}$$

wherein $DPQ_{ij}^{Rank}$ is the rank of each final price for the corresponding buyer i and the corresponding seller j, wherein $LMR_{ij}^{-1}$ is the inverse of the log multiplier ratio for the corresponding buyer i and the corresponding seller j, wherein $CB_i$ is the buyer bid of the corresponding buyer i, wherein $LPQ_j$ is the low price of the corresponding seller j, and wherein $DPQ_{ij}$ is the final price of the corresponding seller j for the corresponding buyer i.

8. The method as recited in claim 1, wherein the high price is further based on a preliminary high price, wherein when at least three sellers are offering the type of service the preliminary high price for each seller j is determined according to:

$$PrelimHPQ_j = \left(1 - \frac{SP_j - LPQ_j}{1.02 \times SP_j - LPQ_{min}}\right) \times SP_j$$
$$+ \left(\frac{SP_j - LPQ_j}{1.02 \times SP_j - LPQ_{min}}\right) \times LPQ_j,$$

wherein PrelimHPQj is the preliminary high price for seller j, wherein SPj is the suggested price for seller j, wherein LPQj is the lowest price for seller j, and wherein LPQmin is a minimum lowest price among each lowest price for any seller.

9. The method as recited in claim 1, wherein the high price is further based on a preliminary high price, wherein when fewer than three sellers are offering the type of service the preliminary high price for each seller j is determined according to:

$$\text{PrelimHPQ}_j = 0.3 \times SP + 0.7 \times LPQj$$

wherein PrelimHPQj is the preliminary high price of seller j, wherein SP is the suggested price and wherein LPQj is the lowest price of seller j.

10. The method as recited in claim 1, wherein the high price is the preliminary high price in a first instance, and wherein the high price is the lowest price in a second instance.

11. The method as recited in claim 1, wherein the suggested price includes a suggested retail price before any seller-initiated fee.

12. The method as recited in claim 11, wherein any seller-initiated fee includes any options and any seller-provided accessory.

13. The method as recited in claim 11, wherein any seller-initiated fee excludes any non-seller-initiated fee.

14. The method as recited in claim 1, wherein the log multiplier search radius ratio is computed based on each search radius according to:

$$LMSRR_i = \frac{\ln CSR_i}{\ln 500} = \log_{500} CSR_i$$

wherein CSRi is the search radius in miles for buyer i.

15. The method as recited in claim 14, wherein the low distance search radius is a 25-mile search radius and the high distance search radius is a 500-mile search radius.

16. The method as recited in claim 1, further comprising rejecting any final price if the distance from the corresponding buyer to the corresponding seller is more than the search radius specified by the corresponding buyer.

17. The method as recited in claim 16, further comprising rejecting any final price if the final price from the corresponding seller exceeds the buyer bid from the corresponding buyer.

18. The method as recited in claim 1, further comprising rejecting any final price if the final price from the corresponding seller exceeds the buyer bid from the corresponding buyer.

19. The method of claim 1, further comprising:
   implementing, at the dynamic database, a variance analysis to determine a probability estimate indicative of a time to sell, based on a given price for the service; and
   providing the probability estimate to the seller j.

* * * * *